United States Patent
Aiba et al.

(10) Patent No.: US 9,641,301 B2
(45) Date of Patent: *May 2, 2017

(54) TERMINAL DEVICE, BASE STATION DEVICE, COMMUNICATION METHOD, AND INTEGRATED CIRCUIT

(71) Applicant: Sharp Kabushiki Kaisha, Osaka-shi, Osaka (JP)

(72) Inventors: Tatsushi Aiba, Osaka (JP); Shoichi Suzuki, Osaka (JP); Kazunari Yokomakura, Osaka (JP); Kimihiko Imamura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/778,663

(22) PCT Filed: Mar. 11, 2014

(86) PCT No.: PCT/JP2014/056341
§ 371 (c)(1),
(2) Date: Sep. 21, 2015

(87) PCT Pub. No.: WO2014/156617
PCT Pub. Date: Oct. 2, 2014

(65) Prior Publication Data
US 2016/0056933 A1 Feb. 25, 2016

(30) Foreign Application Priority Data

Mar. 27, 2013 (JP) ................................. 2013-065647

(51) Int. Cl.
*H04L 5/00* (2006.01)
*H04L 1/18* (2006.01)
*H04W 72/04* (2009.01)
*H04W 74/08* (2009.01)
*H04W 72/12* (2009.01)

(52) U.S. Cl.
CPC .......... *H04L 5/0048* (2013.01); *H04L 1/1861* (2013.01); *H04W 72/0406* (2013.01);
(Continued)

(58) Field of Classification Search
CPC ..... H04L 5/0048; H04L 1/1861; H04L 5/001; H04W 72/0406; H04W 74/0833; H04W 72/1289
See application file for complete search history.

(56) References Cited

U.S. PATENT DOCUMENTS

2011/0268028 A1* 11/2011 Stern-Berkowitz ... H04L 5/0048
370/328
2012/0281654 A1* 11/2012 Aiba ..................... H04L 5/0007
370/329
(Continued)

OTHER PUBLICATIONS

Ericsson et al., "On standardization impact of TDD UL-DL adaptation", 3GPP TSG-RAN WG1 #69, R1-122016, May 21-25, 2012, pp. 1-3.
(Continued)

*Primary Examiner* — Ajay Cattungal
(74) *Attorney, Agent, or Firm* — Keating & Bennett, LLP

(57) ABSTRACT

According to the present invention, there are provided a base station device, a terminal device, a communication method, and an integrated circuit capable of performing communication more efficiently when the terminal device transmits an uplink signal based on scheduling by the base station device. The terminal device includes a setting unit that sets a first uplink-downlink configuration, a second uplink-downlink configuration, and a third uplink-downlink configuration, a reception unit that monitors a physical downlink control channel accompanied with a downlink control information format which is used to schedule a physical downlink shared channel in a downlink subframe based on the third uplink-downlink configuration and includes infor- (Continued)

mation making a request for transmitting a sounding reference signal, and a transmission unit that transmits or drops the sounding reference signal and transmit an HARQ-ACK for transmission with the physical downlink shared channel.

8 Claims, 15 Drawing Sheets

(52) U.S. Cl.
CPC ......... *H04L 5/001* (2013.01); *H04W 72/1289* (2013.01); *H04W 74/0833* (2013.01)

(56) References Cited

U.S. PATENT DOCUMENTS

| | | | |
|---|---|---|---|
| 2014/0036749 A1* | 2/2014 | Wang | H04W 28/12 370/311 |
| 2014/0269338 A1* | 9/2014 | Jung | H04L 5/0055 370/241 |
| 2015/0124673 A1* | 5/2015 | Ouchi | H04W 52/146 370/311 |
| 2015/0237626 A1* | 8/2015 | Li | H04W 72/0446 370/280 |

OTHER PUBLICATIONS

Ericsson et al., "Signalling support for dynamic TDD", 3GPP TSG-RAN WG1 #72, R1-130558, Jan. 28-Feb. 1, 2013, 3 pages.
Aiba, T. et al., "Terminal Device, Base Station Device, Communication Method, and Integrated Circuit;" U.S. Appl. No. 14/778,660, filed Sep. 21, 2015.

* cited by examiner

FIG. 9

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 10

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | 4 | | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 11

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 12

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 13

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | | | | | | | | | | |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 14

|     | FIRST SETTING | SECOND SETTING | THIRD SETTING |
|-----|---------------|----------------|---------------|
| (a) | D             | D              | D             |
| (b) | U             | U              | U             |
| (c) | U             | D              | U or D        |
| (d) | S             | S              | S             |
| (e) | S             | D              | S or D        |

FIG. 15

| | subframe index | | | | | | | | | | |
|---|---|---|---|---|---|---|---|---|---|---|---|
| | 0 | 1 | | 2 | 3 | 4 | 5 | 6 | | 7 | 8 | 9 |
| | 1st symbol of UpPTS | 2nd symbol of UpPTS | | | | | | 1st symbol of UpPTS | 2nd symbol of UpPTS | | | |
| $K_{SRS}$ in case UpPTS length of 2symbols | 0 | 1 | | 2 | 3 | 4 | | 5 | 6 | 7 | 8 | 9 |
| $K_{SRS}$ in case UpPTS length of 1symbol | 1 | | | 2 | 3 | 4 | | 6 | | 7 | 8 | 9 |

TERMINAL DEVICE, BASE STATION DEVICE, COMMUNICATION METHOD, AND INTEGRATED CIRCUIT

TECHNICAL FIELD

The present invention relates to a terminal device, a base station device, a communication method, and an integrated circuit.

BACKGROUND ART

Radio access schemes and radio networks (hereinafter referred to as "Long Term Evolution (LTE)" or "Evolved Universal Terrestrial Radio Access (EUTRA)") of cellular mobile communication have been examined in 3rd Generation Partnership Project (3GPP). In LTE, an Orthogonal Frequency Division Multiplexing (OFDM) scheme is used as a downlink communication scheme. In LTE, a Single-Carrier Frequency Division Multiple Access (SC-FDMA) scheme is used as an uplink communication scheme. In LTE, a base station device is referred to as an evolved NodeB (eNodeB) and a terminal device is referred to as a User Equipment (UE). LTE is a cellular communication system in which a plurality of areas covered by base station devices are arranged in a cell form. A single base station device may manage a plurality of cells.

LTE corresponds to Time Division Duplex (TDD). LTE adopting a TDD scheme is referred to as TD-LTE or LTE TDD. TDD is a technology for enabling full duplex communication in a single frequency band by performing time division multiplexing on an uplink signal and a downlink signal. LTE corresponds to frequency division duplex (FDD).

In TD-LTE, a traffic adaptation technology and an interference reduction technology (DL-UL Interference Management and Traffic Adaptation) for changing a ratio of an uplink resource to a downlink resource according to an uplink traffic and a downlink traffic have been examined. When the traffic adaption technology is applied, a throughput can be considerably improved in radio communication systems more than when a ratio of an uplink resource to a downlink resource is not changed.

NPL 1 proposes a method of using a flexible subframe as a method of realizing traffic adaptation. A base station device can transmit a downlink signal or can receive an uplink signal with a flexible subframe. A terminal device regards a flexible subframe as a downlink subframe unless the terminal device is instructed to transmit an uplink signal by the base station device. Here, the traffic adaptation technology is also referred to as dynamic TDD.

NPL 1 describes that a Hybrid Automatic Repeat reQuest (HARQ) timing corresponding to a Physical Downlink Shared CHannel (PDSCH) is decided based on a newly introduced uplink-downlink configuration (UL-DL configuration) and a HARQ timing corresponding to a Physical Uplink Shared CHannel (PUSCH) is decided based on a first uplink-downlink configuration.

NPL 2 describes that (a) an uplink-downlink reference configuration (UL/DL Reference Configuration) is introduced and (b) several subframes can be scheduled for either uplink or downlink in accordance with dynamic grant/assignment.

CITATION LIST

Non Patent Literature

NPL 1: "On standardization impact of TDD UL-DL adaptation", R1-122016, 3GPP TSG-RAN WG1 Meeting #69, 21 to 25 May 2012

NPL 2: "Signalling support for dynamic TDD", R1-130558, 3GPP TSG-RAN WG1 Meeting #72, 28 th Jan. to 1 Feb. 2013

DISCLOSURE OF THE INVENTION

Problems to be Solved by the Invention

In the above-described radio communication system, however, a specific procedure when a terminal device transmits an uplink signal was not described. For example, a specific procedure when a terminal device transmits an uplink signal based on scheduling by a base station device was not described.

The present invention has been devised in light of the foregoing circumstances and an object of the present invention is to provide a terminal device, a base station device, a communication method, and an integrated circuit capable of performing communication more efficiently when the terminal device transmits an uplink signal based on scheduling by the base station device.

Means for Solving the Problems (1) To achieve the foregoing object, the present invention has finalized the following units. That is, according to an aspect of the invention, there is provided a terminal device communicating with a base station device and including: a setting unit that sets a first uplink-downlink configuration, a second uplink-downlink configuration, and a third uplink-downlink configuration; a reception unit that monitors a physical downlink control channel accompanied with a downlink control information format which is used to schedule a physical downlink shared channel in a downlink subframe based on the third uplink-downlink configuration and includes information making a request for transmitting a sounding reference signal; and a transmission unit that transmits the sounding reference signal when the information making the request for transmitting the sounding reference signal in subframe n is detected and when a first subframe set by a higher layer and satisfying n+k (where k≥4) is an uplink subframe based on the third uplink-downlink configuration, drops the sounding reference signal when the first subframe set by the higher layer and satisfying n+k (where k≥4) is a downlink subframe based on the third uplink-downlink configuration, and transmits an HARQ-ACK for transmission with the physical downlink shared channel in the subframe n instructed based on detection of the physical downlink control channel accompanied with the downlink control information format in the subframe n by using subframe n+k. The k is given based on the second uplink-downlink configuration. A subframe set as an uplink subframe in the first uplink-downlink configuration and set as a downlink subframe in the second uplink-downlink configuration is usable as an uplink subframe or the downlink subframe in the third uplink-downlink configuration.

(2) A base station device communicating with a terminal device include: a setting unit that sets a first uplink-downlink configuration, a second uplink-downlink configuration, and a third uplink-downlink configuration; a transmission unit that transmits a downlink control information format which is used to schedule a physical downlink shared channel in a downlink subframe based on the third uplink-downlink configuration and includes information making a request for transmitting a sounding reference signal by using a physical downlink control channel; and a reception unit that receives the sounding reference signal when the information making the request for transmitting the sounding reference signal in subframe n is transmitted and when a first subframe set by a higher layer and satisfying n+k (where k≥4) is an uplink subframe based on the third uplink-downlink configuration, considers the sounding reference signal to be dropped when the first subframe set by the higher layer and satisfying n+k (where k≥4) is a downlink subframe based on the third uplink-downlink configuration, and receives an HARQ-ACK for transmission with the physical downlink shared channel in the subframe n based on transmission of the physical downlink control channel of the downlink control information format in the subframe n by using subframe n+k. The k is given based on the second uplink-downlink configuration. A subframe set as an uplink subframe in the first uplink-downlink configuration and set as a downlink subframe in the second uplink-downlink configuration is usable as an uplink subframe or the downlink subframe in the third uplink-downlink configuration.

(3) A communication method performed by a terminal device communicating with a base station device includes: setting a first uplink-downlink configuration, a second uplink-downlink configuration, and a third uplink-downlink configuration; monitoring a physical downlink control channel accompanied with a downlink control information format which is used to schedule a physical downlink shared channel in a downlink subframe based on the third uplink-downlink configuration and includes information making a request for transmitting a sounding reference signal; transmitting the sounding reference signal when the information making the request for transmitting the sounding reference signal in subframe n is detected and when a first subframe set by a higher layer and satisfying n+k (where k≥4) is an uplink subframe based on the third uplink-downlink configuration, and dropping the sounding reference signal when the first subframe set by the higher layer and satisfying n+k (where k≥4) is a downlink subframe based on the third uplink-downlink configuration; and transmitting, in subframe n+k, an HARQ-ACK for transmission with the physical downlink shared channel in the subframe n instructed based on detection of the physical downlink control channel accompanied with the downlink control information format in the subframe n. The k is given based on the second uplink-downlink configuration. A subframe set as an uplink subframe in the first uplink-downlink configuration and set as a downlink subframe in the second uplink-downlink configuration is usable as an uplink subframe or the downlink subframe in the third uplink-downlink configuration.

(4) A communication method performed by a base station device communicating with a terminal device includes: setting a first uplink-downlink configuration, a second uplink-downlink configuration, and a third uplink-downlink configuration; transmitting a downlink control information format which is used to schedule a physical downlink shared channel in a downlink subframe based on the third uplink-downlink configuration and includes information making a request for transmitting a sounding reference signal by using a physical downlink control channel; receiving the sounding reference signal when the information making the request for transmitting the sounding reference signal in subframe n is transmitted and when a first subframe set by a higher layer and satisfying n+k (where k≥4) is an uplink subframe based on the third uplink-downlink configuration, and considering the sounding reference signal to be dropped when the first subframe set by the higher layer and satisfying n+k (where k≥4) is a downlink subframe based on the third uplink-downlink configuration; and receiving an HARQ-ACK for transmission with the physical downlink shared channel in the subframe n based on transmission of the physical downlink control channel of the downlink control information format in the subframe n by using subframe n+k. The k is given based on the second uplink-downlink configuration. A subframe set as an uplink subframe in the first uplink-downlink configuration and set as a downlink subframe in the second uplink-downlink configuration is usable as an uplink subframe or the downlink subframe in the third uplink-downlink configuration.

(5) An integrated circuit mounted on a terminal device communicating with a base station device causes the terminal device to have: a function of setting a first uplink-downlink configuration, a second uplink-downlink configuration, and a third uplink-downlink configuration; a function of monitoring a physical downlink control channel accompanied with a downlink control information format which is used to schedule a physical downlink shared channel in a downlink subframe based on the third uplink-downlink configuration and includes information making a request for transmitting a sounding reference signal; and a function of transmitting the sounding reference signal when the information making the request for transmitting the sounding reference signal in subframe n is detected and when a first subframe set by a higher layer and satisfying n+k (where k≥4) is an uplink subframe based on the third uplink-downlink configuration, dropping the sounding reference signal when the first subframe set by the higher layer and satisfying n+k (where k≥4) is a downlink subframe based on the third uplink-downlink configuration, and transmitting an HARQ-ACK for transmission with the physical downlink shared channel in the subframe n instructed based on detection of the physical downlink control channel accompanied with the downlink control information format in the subframe n by using subframe n+k. The k is given based on the second uplink-downlink configuration. A subframe set as an uplink subframe in the first uplink-downlink configuration and set as a downlink subframe in the second uplink-downlink configuration is usable as an uplink subframe or the downlink subframe in the third uplink-downlink configuration.

(6) An integrated circuit mounted on a base station device communicating with a terminal device causes the base station device to have: a function of setting a first uplink-downlink configuration, a second uplink-downlink configuration, and a third uplink-downlink configuration; a function of transmitting a downlink control information format which is used to schedule a physical downlink shared channel in a downlink subframe based on the third uplink-downlink configuration and includes information making a request for transmitting a sounding reference signal by using a physical downlink control channel; and a function of receiving the sounding reference signal when the information making the request for transmitting the sounding reference signal in subframe n is transmitted and when a first subframe set by a higher layer and satisfying n+k (where k≥4) is an uplink subframe based on the third uplink-downlink configuration, considering the sounding reference signal to be dropped when the first subframe set by the higher layer and satisfying n+k (where k≥4) is a downlink subframe based on the third uplink-downlink configuration, and receiving an HARQ-ACK for transmission with the physical downlink shared channel in the subframe n based on transmission of the physical downlink control channel of the downlink control information format in the subframe n by using subframe n+k. The k is given based on the second uplink-downlink configuration. A subframe set as an uplink subframe in the first uplink-downlink configuration and set as a downlink subframe in the second uplink-downlink configuration is usable as an uplink subframe or the downlink subframe in the third uplink-downlink configuration.

Effects of the Invention

According to the present invention, the terminal device can transmit an uplink signal based on scheduling by the base station device, and thus can perform more efficient communication.

BRIEF DESCRIPTION OF THE DRAWINGS

FIG. 9 is a table illustrating an example of an uplink-downlink configuration.

FIG. 10 is a diagram for describing first configuration.

FIG. 11 is another diagram for describing the first configuration.

FIG. 12 is a further another diagram for describing the first configuration.

FIG. 13 is a diagram for describing second configuration.

FIG. 14 is a diagram illustrating a relation between subframes instructed using the first configuration, the second configuration, and third configuration.

FIG. 15 is a diagram for describing transmission of a second SRS.

MODE FOR CARRYING OUT THE INVENTION

Hereinafter, a first embodiment of the present invention will be described.

The embodiment can be applied to a single cell configured for a terminal device. Further, the embodiment may be applied to each of a plurality of cells configured for a terminal device. Furthermore, the embodiment may be applied to some of the plurality of cells configured for a terminal device. Here, a technology in which a terminal device performs communication in a plurality of cells is referred to as cell aggregation or carrier aggregation. Here, a cell configured for a terminal device is also referred to as a serving cell.

In a radio communication system according to the embodiment, at least a Time Division Duplex (TDD) scheme is applied (supported). When the cell aggregation is applied (supported), the TDD scheme may be applied to each of a plurality of cells. When a cell to which the TDD scheme is applied and a cell to which a Frequency Division Duplex (FDD) scheme is applied are aggregated, the embodiment may be applied to the cell to which the TDD scheme is applied.

In the embodiment, "X/Y" includes a meaning of "X or Y". In the embodiment, "X/Y" includes a meaning of "X and Y". In the embodiment, "X/Y" includes a meaning of "X and/or Y".

Figure 1:
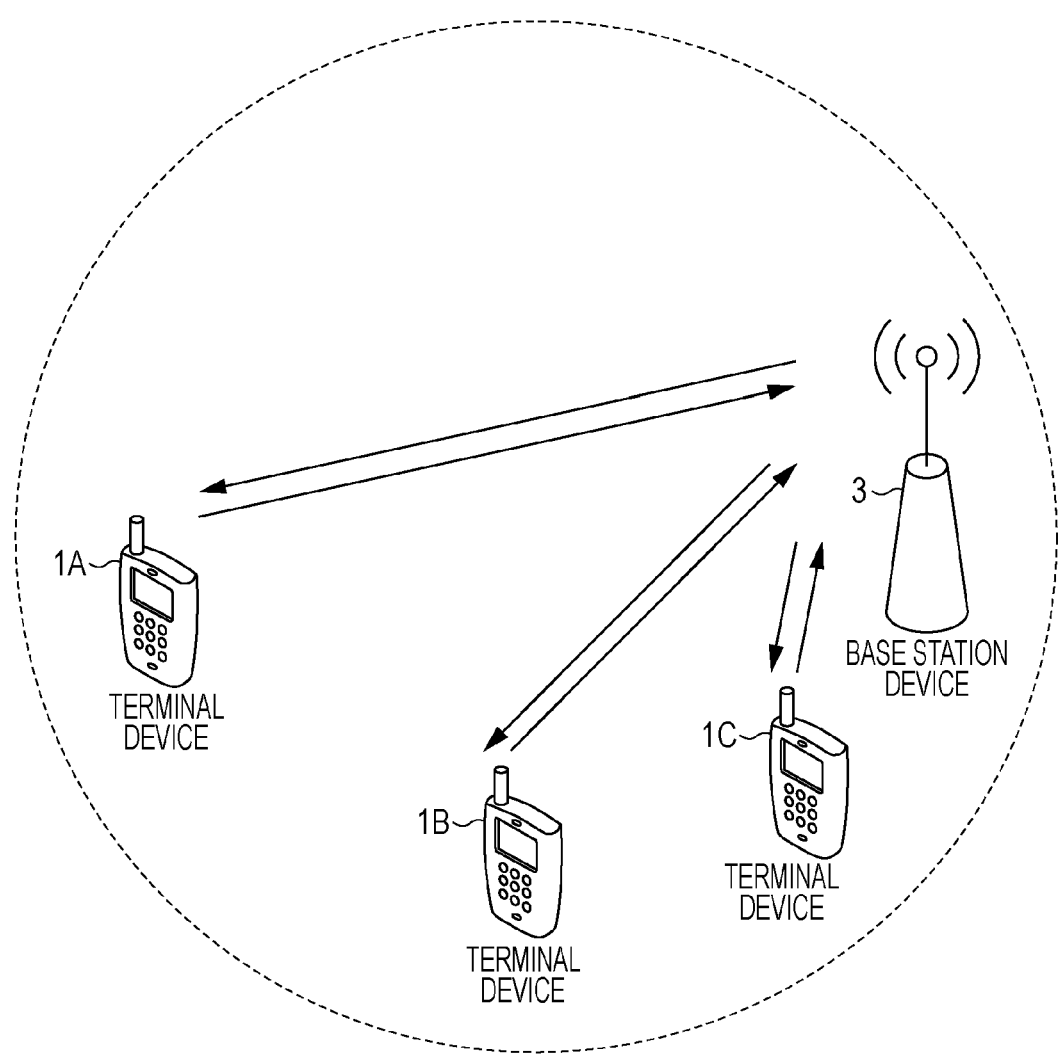
FIG. 1 is a diagram illustrating an example of a radio communication system according to an embodiment.

FIG. 1 is a diagram illustrating an example of a radio communication system according to the embodiment. In FIG. 1, the radio communication system includes terminal devices 1A to 1C and a base station device 3. Hereinafter, the terminal devices 1A to 1C are also referred to as the terminal devices 1.

The embodiment may be applied to the terminal devices 1 in which dynamic TDD (configuration (transmission mode) related to dynamic TDD) is configured by the base station device 3.

In FIG. 1, at least the following uplink physical channels are used for uplink radio communication from the terminal device 1 to the base station device 3. The uplink physical channels are used to transmit information output from a higher layer.

Physical Uplink Control CHannel (PUCCH)
Physical Uplink Shared CHannel (PUSCH)
Physical Random Access CHannel (PRACH)

The PUCCH is used to transmit Uplink Control Information (UCI). Here, the uplink control information includes an ACKnowledgement (ACK) or a Negative-ACKnowledgement (NACK) (ACK/NACK) for downlink data (a downlink transport block or a Downlink-Shared CHannel (DL-SCH)). The ACK/NACK for the downlink data is also referred to as HARQ-ACK, an HARQ feedback, or response information.

The uplink control information includes Channel State Information (CSI) regarding downlink. The uplink control information includes a Scheduling Request (SR) used for requesting Uplink-Shared CHannel (UL-SCH) resources.

The PUSCH is used to transmit uplink data (an uplink transport block or an UL-SCH). The PUSCH may be used to transmit the ACK/NACK and/or the channel state information along with the uplink data. The PUSCH may be used to transmit only the channel state information or only the ACK/NACK and the channel state information.

The PRACH is used to transmit a random access preamble. The PRACH (or a random access procedure) is mainly used for the terminal device 1 to synchronize a time domain with the base station device 3. The PRACH (or a random access procedure) is also used for an initial connection establishment procedure, a handover procedure, a connection re-establishment procedure, synchronization (timing adjustment) of uplink transmission, and transmission of a scheduling request.

In FIG. 1, the following uplink physical signal is used for uplink radio communication. The uplink physical signal is not used to transmit information output form a higher layer, but is used for a physical layer.

Uplink Reference Signal (UL RS)

In the embodiment, the following two types of uplink reference signals are used.

DeModulation Reference Signal (DMRS)
Sounding Reference Signal (SRS)

The DMRS is related to transmission of the PUSCH or the PUCCH. The DMRS is subjected to time multiplexing along with the PUSCH or the PUCCH. For example, the base station device 3 uses the DMRS to correct a propagation path of the PUSCH or the PUCCH. Transmission of both the PUSCH and the DMRS is simply referred to as transmission of the PUSCH. Transmission of both the PUCCH and the DMRS is simply referred to as transmission of the PUCCH.

The SRS is not related to transmission of the PUSCH or the PUCCH. For example, the base station device 3 uses the SRS to measure an uplink channel state. The terminal device 1 transmits a first SRS with a first resource set by a higher layer. The first SRS is also referred to as a periodic SRS (a periodically transmitted SRS).

The terminal device 1 transmits the first SRS in a subframe configured using a signal of a higher layer by the base station device 3. For example, the base station device 3 configures the subframes used to transmit the first SRS by transmitting information regarding a periodicity and an offset using a signal of a higher layer.

The terminal device 1 transmits a second SRS on a second resource configured by a higher layer. The second SRS is transmitted only once based on an instruction from the base station device 3. The second SRS is also referred to as an aperiodic SRS (an aperiodically transmitted SRS). The terminal device 1 transmits the second SRS based on information (referred to as an SRS request or an SRS request field), included in a DCI format, indicating whether a transmission of an SRS is requested.

For example, when the terminal device 1 receives, in a subframe n, a DCI format including an SRS request (also referred to as a positive SRS request) set to 1, the terminal device 1 transmits the second SRS in the first subframe satisfying n+k (for example, k≥4). Here, subframes (also referred to as SRS subframes) which can be used to transmit the SRS are configured using a signal of a higher layer by the base station device 3. That is, the terminal device 1 transmits the second SRS in any one of SRS subframes configured by the base station device 3.

The base station device 3 can transmit the SRS request, included in a downlink assignment. The base station device 3 can transmit the SRS request, included in an uplink grant.

In FIG. 1, the following downlink physical channels are used for downlink radio communication from the base station device 3 to the terminal device 1. The downlink physical channels are used to transmit information output from a higher layer.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)

The PBCH is used to report a Master Information Block (MIB or a Broadcast CHannel (BCH)) used commonly with the terminal device 1. For example, the MIB is transmitted at intervals of 40 ms. Further, the MIB is transmitted repeatedly at a periodicity of 10 ms. Specifically, the MIB is initially transmitted with subframe 0 of a radio frame in which "SFN mod 4=0" is satisfied, and the MIB is retransmitted (repeated) with subframe 0 of all the other radio frames. Here, a System Frame Number (SFN) is a radio frame number. The MIB is system information. For example, the MIB includes information indicating the SFN.

The PCFICH is used to transmit information for giving an instruction for a region (for example, the number of OFDM symbols) used to transmit the PDCCH.

The PHICH is used to transmit the ACK/NACK for uplink data received by the base station device 3. The PHICH is used to transmit an HARQ indicator (an HARQ feedback or response information) indicating the ACK/NACK for the uplink data.

Hereinafter, the PHICH will be described as a downlink physical channel used to transmit the ACK/NACK for the uplink data. However, the same embodiment can be applied even when another downlink physical channel having the same function is used (defined).

When the terminal device 1 receives the HARQ indicator indicating the ACK from the base station device 3, the terminal device 1 does not retransmit the corresponding uplink data. When the terminal device 1 receives the HARQ indicator indicating the NACK from the base station device 3, the terminal device 1 retransmits the corresponding uplink data. Here, the single PHICH may be used to transmit the HARQ indicator for single uplink data. The base station device 3 may transmit the HARQ indicators for a plurality of pieces of uplink data included in the same PUSCH using a plurality of PHICHs.

The PDCCH and the EPDCCH are used to transmit Downlink Control Information (DCI). Here, a plurality of DCI formats are defined to transmit the downlink control information.

For example, DCI format 1A used for scheduling of one PDSCH (transmission of a codeword of one PDSCH or one downlink transport block) in one cell is defined as the DCI format for downlink.

DCI format 2 used for scheduling of one PDSCH (transmission of a codeword of up to two PDSCHs or up to two downlink transport blocks) in one cell is defined as the DCI format for downlink.

For example, the DCI format for downlink includes downlink control information such as information regarding resource allocation of the PDSCH and information regarding a Modulation and Coding Scheme (MCS). Here, the DCI format for downlink is also referred to as a downlink grant (or a downlink assignment).

For example, DCI format 0 used for scheduling of one PUSCH (transmission of a codeword of one PUSCH or one uplink transport block) in one cell is defined as the DCI format for uplink.

DCI format 4 used for scheduling of one PUSCH (transmission of a code word of up to two PUSCHs or up to two uplink transport blocks) in one cell is defined as the DCI format for uplink. That is, DCI format 4 is used for scheduling of transmission on the PUSCH using a plurality of antenna ports.

For example, the DCI format for uplink includes downlink control information such as information regarding resource allocation of the PUSCH and information regarding a Modulation and Coding Scheme (MCS). Here, the DCI format for uplink is also referred to as an uplink grant (or an uplink assignment).

When resources of the PDSCH are scheduled using the downlink assignment, the terminal device 1 receives downlink data on the scheduled PDSCH. When resources of the PUSCH are scheduled using the uplink grant, the terminal device 1 transmits uplink data and/or the uplink control information on the scheduled PUSCH.

The PDSCH is used to transmit downlink data (a downlink transport block or a DL-SCH). The PDSCH is used to transmit a random access response grant. The random access response grant is used to schedule the PUSCH in a random access procedure. Here, the random access response grant is instructed to a physical layer by a higher layer (for example, a MAC layer).

The PDSCH is used to transmit a system information block type 1 message. The system information block type 1 message may include information regarding the structure of a special subframe (for example, the lengths of DwPTS, GP, and UpPTS). The system information block type 1 message is information cell-specific (cell-unique) information.

The PDSCH is used to transmit a system information message. The system information message includes a system information block other than the system information block type 1 message. The system information message is cell-specific (cell-unique) information.

The PDSCH is used to transmit an RRC message. The RRC message is an information/signal processed in a Radio Resource Control (RRC) layer. The RRC message may be a message dedicated for the certain terminal device 1 (also referred to as a dedicated signaling). That is, user device-specific (user device-unique) information is transmitted using a dedicated message.

The PDSCH used to transmit a MAC Control Element (CE). The MAC CE is an information/signal processed in a Medium Access Control (MAC) layer. Here, the RRC message and/or the MAC CE is also referred to as a higher layer signal (higher layer signaling).

In FIG. 1, a Synchronization signal (SS) and a Downlink Reference Signal (DL RS) are used as downlink physical signals. The downlink physical signals are not used to transmit information output from a higher layer, but are used for the physical layer.

For example, five types of downlink reference signals, a Cell-specific Reference Signal (CRS), a UE-specific Reference Signal (URS) related to the PDSCH, a DeModulation Reference Signal (DMRS) related to the EPDCCH, a Non-Zero Power Channel State Information Reference Signal (NZP CSI-RS), and a Zero Power Channel State Information Reference Signal (ZP CSI-RS), are used in FIG. 1.

Here, the downlink physical channels and the downlink physical signals are also collectively referred to as downlink signals. The uplink physical channels and the uplink physical signals are also collectively referred to as uplink signals. The downlink physical channels and the uplink physical channels are also collectively referred to as physical channels. The downlink physical signals and the uplink physical signals are also collectively referred to as physical signals.

The BCH, the UL-SCH, and the DL-SCH are transport channels. Channels used in the MAC layer are referred to as transport channels. Units of the transport channels used in the MAC layer are referred to as Transport Blocks (TB) or MAC Protocol Data Units (PDUs). For example, control of the HARQ is performed for each transport block in the MAC layer. The transport blocks are units of data delivered from the MAC layer to the physical layer. In the physical layer, the transport block is mapped to a codeword and a coding process or the like is performed for each codeword.

Figure 2:
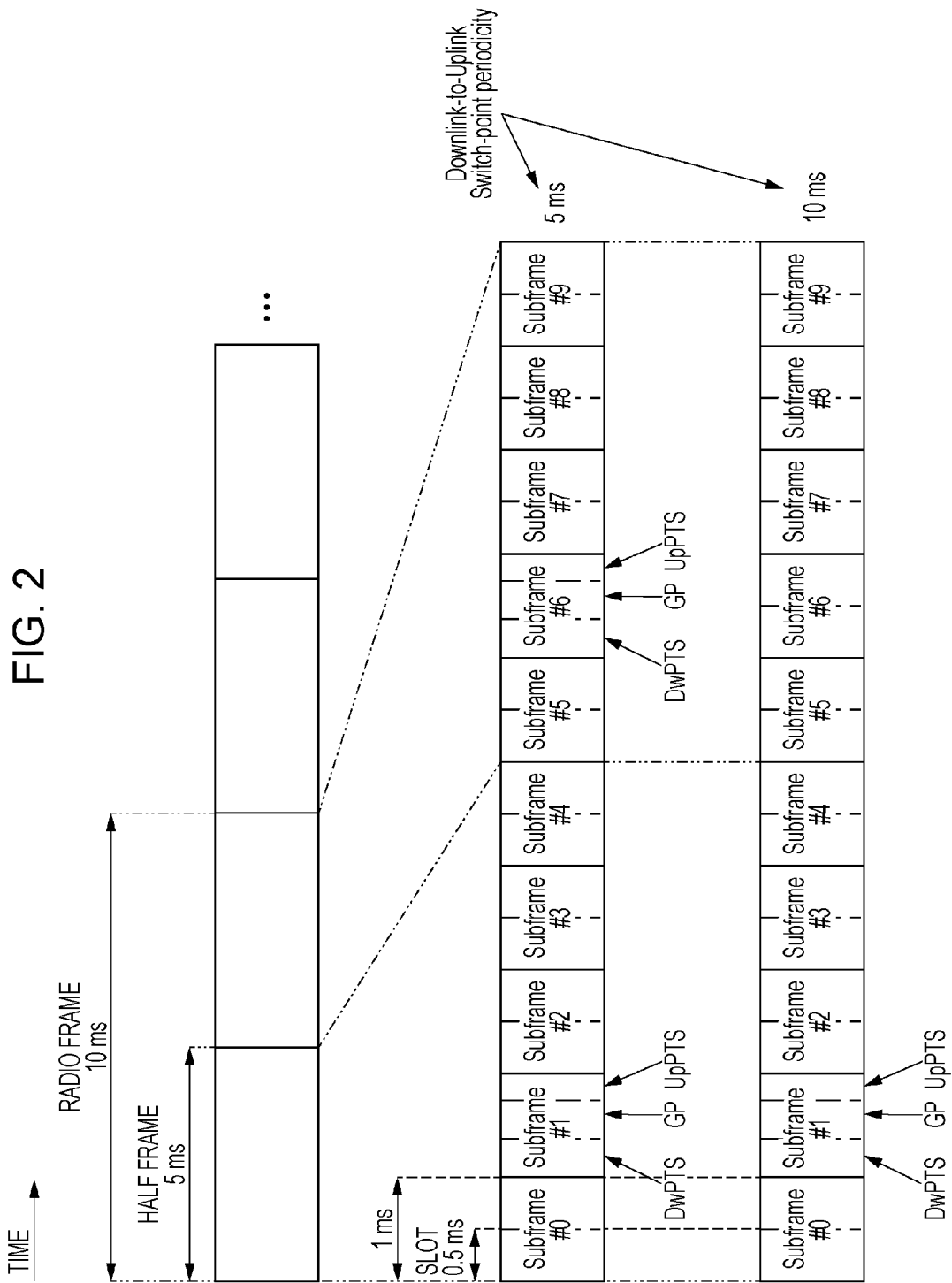
FIG. 2 is a diagram illustrating the structure of a radio frame according to the embodiment.

FIG. 2 is a diagram illustrating an example of the structure of a radio frame according to the embodiment. For example, each radio frame has a length of 10 ms. Each radio frame is configured to include two half frames. Each half frame has a length of 5 ms. Each half frame is configured to include 5 subframes. Each subframe has a length of 1 ms and is defined by 2 continuous slots. Each slot has a length of 0.5 ms. An i-th subframe in the radio frame is configured to include a (2×i)-th slot and a (2×i+1)-th slot. That is, 10 subframes are used at intervals of 10 ms.

In the embodiment, the following three types of subframes are defined.
　　downlink subframe (first subframe)
　　uplink subframe (second subframe)
　　special subframe (third subframe)

The downlink subframe is a subframe that is reserved for downlink transmission. The uplink subframe is a subframe that is reserved for uplink transmission. The special subframe is configured to three fields. The three fields are a Downlink Pilot Time Slot (DwPTS), a Guard Period (GP), and an Uplink Pilot Time Slot (UpPTS). The single radio frame is configured to include at least the downlink subframe, the uplink subframe, and the special subframe.

The total length of the DwPTS, the GP, and the UpPTS is 1 ms. The DwPTS is a field that is reserved for downlink transmission. The UpPTS is a field that is reserved for uplink transmission. The GP is a field that is not used for downlink transmission and uplink transmission. The special subframe may be configured to include only the DwPTS and the GP. Further, the special subframe may be configured to include only the GP and the UpPTS.

For example, the base station device 3 may inform (configure) the terminal device 1 that the special subframe is configured to include only the DwPTS and the GP. The base station device 3 may notify (configure) the terminal device 1 that the special subframe is configured to include only the GP and the UpPTS. The base station device 3 may transmit information indicating the structure of the special subframe using the system information block type 1 message.

In the radio frame, downlink-uplink switch-point periodicities of 5 ms and 10 ms are supported. When the downlink-uplink switch-point periodicity is 5 ms, the special subframe is included in both of the half frames in the radio frame. When the downlink-uplink switch-point periodicity is 10 ms, the special subframe is included only in the first half frame in the radio frame.

Figure 3:
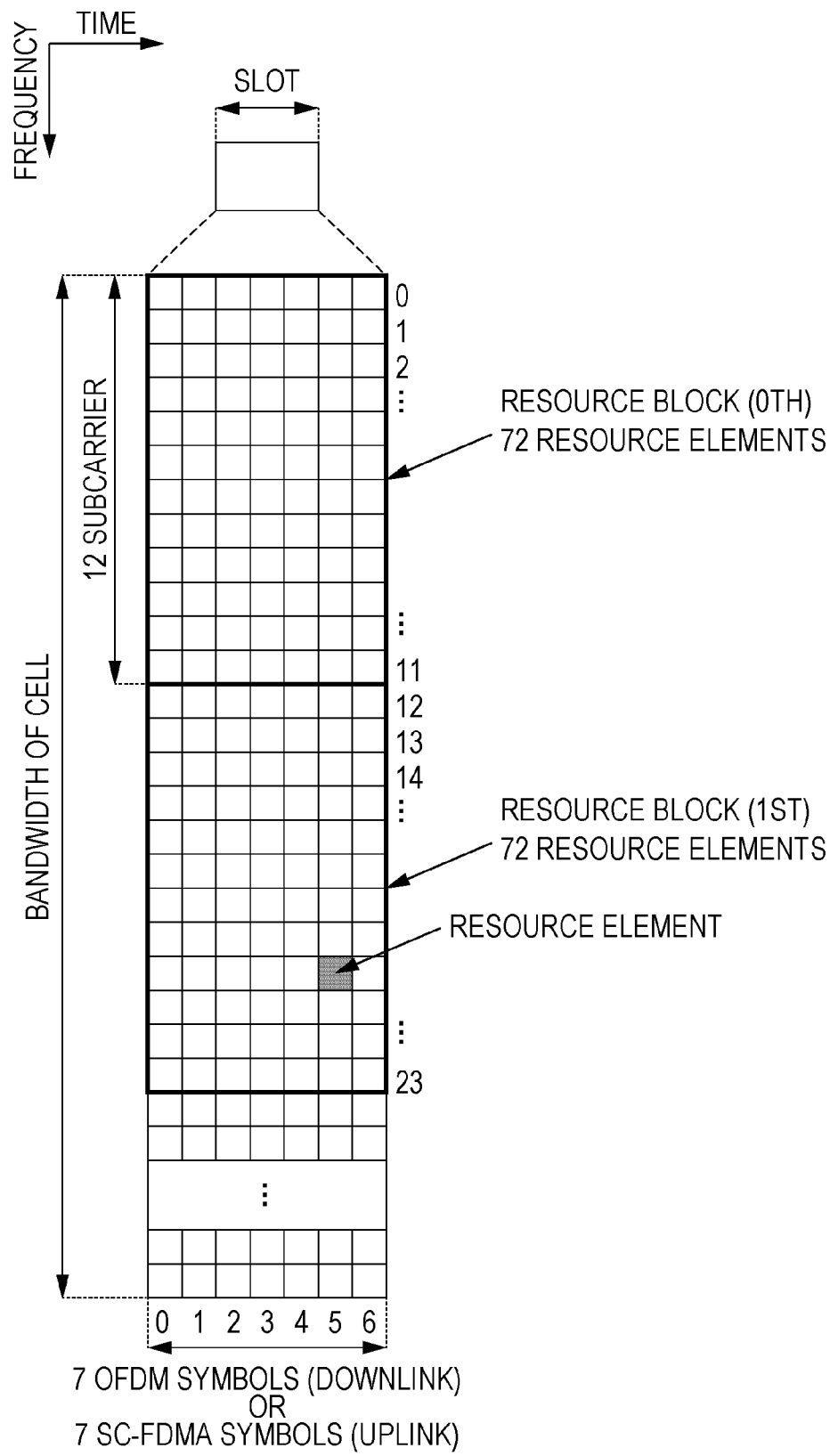
FIG. 3 is a diagram illustrating an example of the structure of a slot according to the embodiment.

FIG. 3 is a diagram illustrating an example of the structure of the slot according to the embodiment. The physical signals or the physical channels transmitted with each slot are expressed by a resource grid. In downlink, the resource grid is defined in accordance with a plurality of subcarriers and a plurality of OFDM symbols. In uplink, the resource grid is defined in accordance with a plurality of subcarriers and a plurality of SC-FDMA symbols.

Here, the number of subcarriers included in one slot depends on the bandwidth of a cell. For example, the number of OFDM symbols or SC-FDMA symbols included in one slot is 7. Each of the elements in the resource grid is referred to as a resource element. The resource element is identified using a subcarrier number and an OFDM symbol or SC-FDMA symbol number.

The resource block is used to express mapping of a certain physical channel (for example, the PDSCH or the PUSCH) to the resource element. For example, one physical resource block is defined by 7 continuous OFDM symbols or SC-FDMA symbols in the time domain and 12 continuous subcarriers in the frequency domain. That is, one physical resource block is configured to include (7×12) resource elements. One physical resource block corresponds to one slot in the time domain and corresponds to 180 kHz in the frequency domain.

Figure 4:
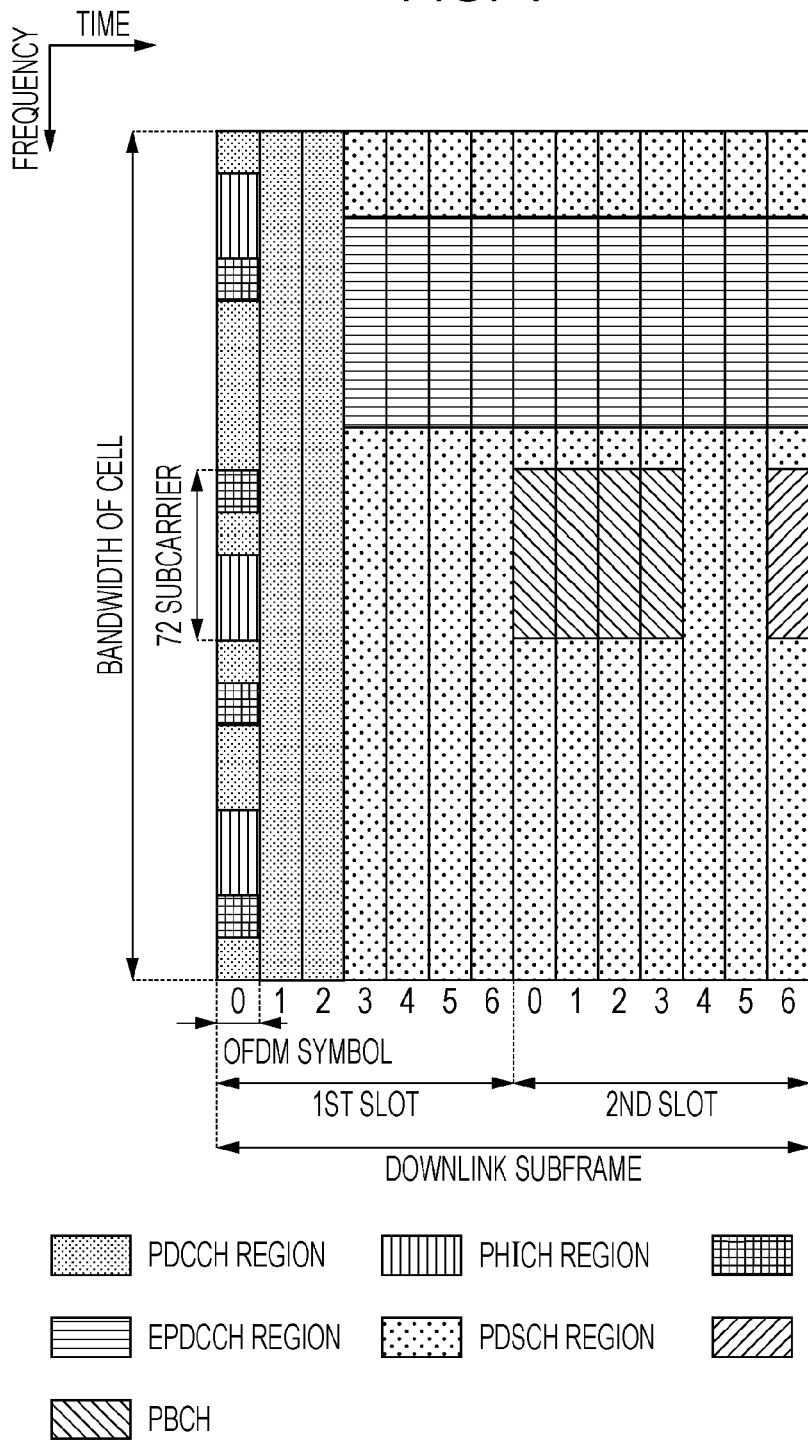
FIG. 4 is a diagram illustrating a mapping example of physical channels and physical signals in a downlink subframe.

FIG. 4 is a diagram illustrating a mapping example of the physical channels and the physical signals in the downlink subframe. The base station device 3 can transmit the downlink physical channels and the downlink physical signals with the downlink subframe.

For example, the PBCH is transmitted only with subframe 0 in the radio frame. The downlink reference signals are mapped to the resource elements distributed in the frequency domain and the time domain. Here, to facilitate the description, the downlink reference signals are not illustrated in FIG. 4.

In the PDCCH region, the plurality of PDCCHs may be subjected to frequency and time multiplexing. In the EPDCCH region, the plurality of EPDCCHs may be subjected to frequency, time, and spatial multiplexing. In the PDSCH region, the plurality of PDSCHs may be subjected to frequency and spatial multiplexing. The PDCCH and the PDSCH or the EPDCCH may be subjected to time multiplexing. The PDSCH and the EPDCCH may be frequency multiplexing.

Figure 5:
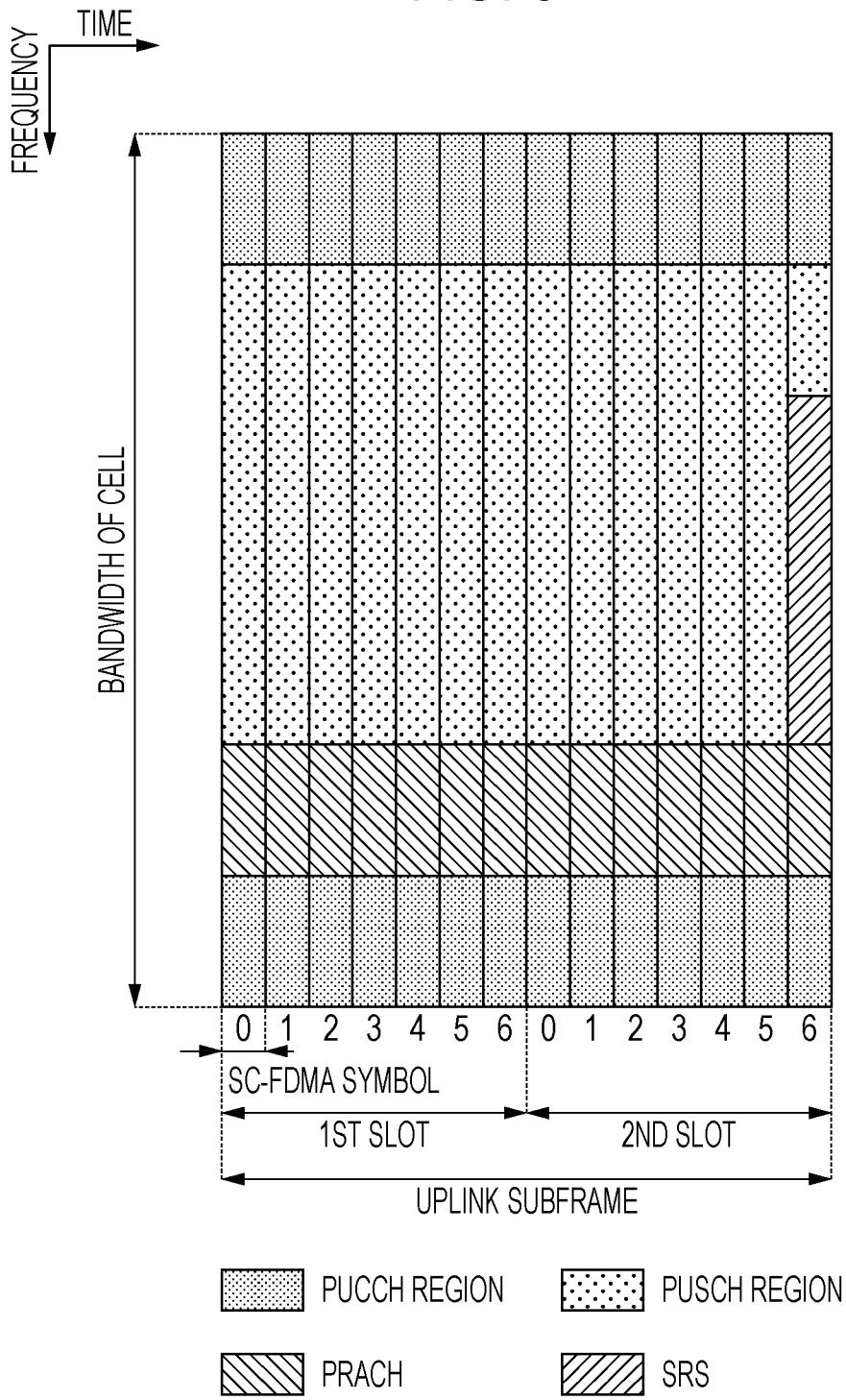
FIG. 5 is a diagram illustrating a mapping example of physical channels and physical signals in an uplink subframe.

FIG. 5 is a diagram illustrating a mapping example of the physical channels and the physical signals in the uplink subframe. The terminal device 1 can transmit the uplink physical channels and the uplink physical signals with the uplink subframe.

For example, in the PUCCH region, the plurality of PUCCHs may be subjected to frequency, time, and code multiplexing. In the PUSCH region, the plurality of PUSCH may be subjected to the frequency and spatial multiplexing. The PUCCH and the PUSCH may be subjected to the frequency multiplexing. The PRACH may be allocated at a single subframe or two subframes. The plurality of PRACHs may be subjected to code multiplexing.

The SRS may be transmitted using the final SC-FDMA symbol of the uplink subframe. The terminal device 1 cannot simultaneously transmit the SRS and the PUCCH/PUSCH/PRACH using the single SC-FDMA symbol in the single cell.

The terminal device 1 can transmit the PUSCH and/or the PUCCH using the SC-FDMA symbols excluding the final SC-FDMA symbol in the uplink subframe and can transmit the SRS using the final SC-FDMA symbol in the uplink subframe with the single uplink subframe of the single cell. That is, the terminal device 1 can transmit both of the SRS and the PUSCH/PUCCH in the single uplink subframe of the single cell. The DMRS is subjected to the time multiplexing along with the PUCCH or the PUSCH. Here, to facilitate the description, the DMRS is not illustrated in FIG. 5.

Figure 6:
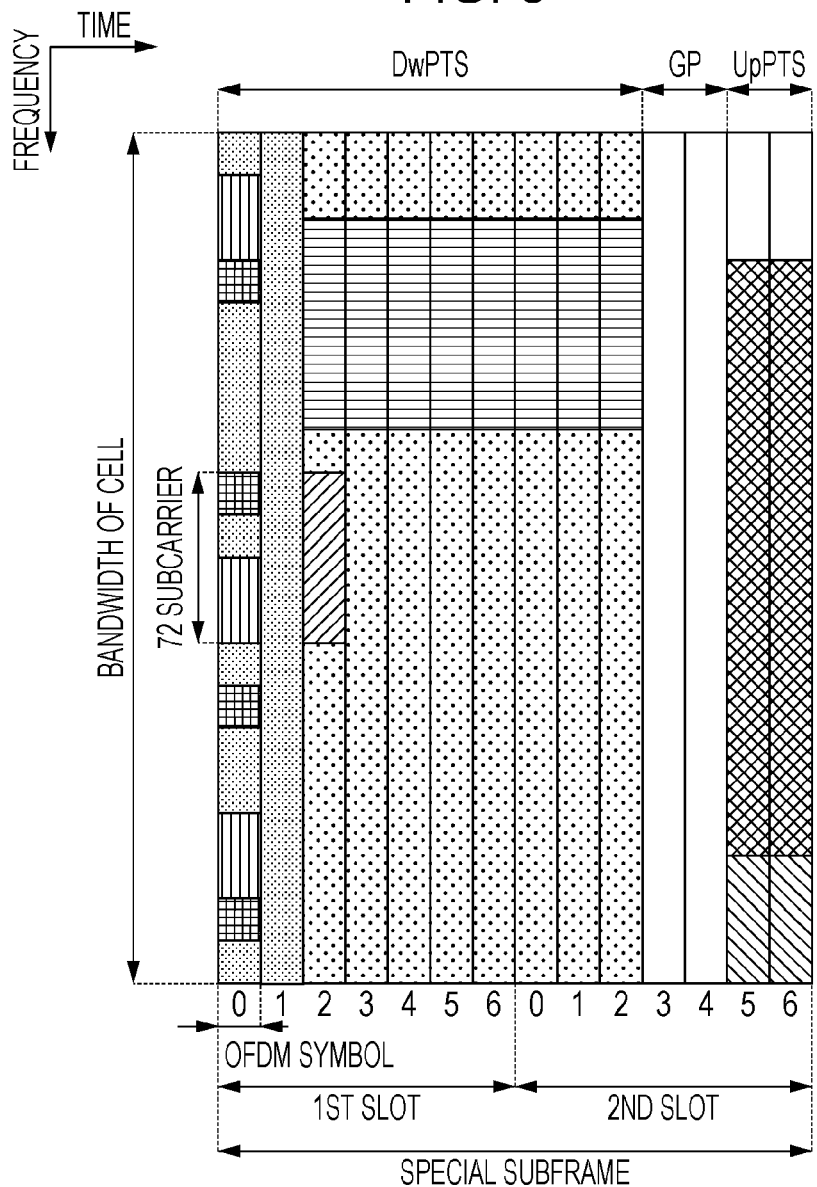
FIG. 6 is a diagram illustrating a mapping example of physical channels and physical signals in a special subframe.

FIG. 6 is a diagram illustrating a mapping example of the physical channels and the physical signals in the special subframe. In FIG. 6, the DwPTS is configured to include the 1st to 9th SC-FDMA symbols in the special subframe. The GP is configured to include the 10th to 12th SC-FDMA symbols in the special subframe. The UpPTS is configured to include the 13th to 14th SC-FDMA symbols in the special subframe.

The base station device 3 may transmit the PCFICH, the PHICH, the PDCCH, the EPDCCH, the PDSCH, a synchronization signal, and a downlink reference signal in the DwPTS of the special subframe. The base station device 3 may not transmit the PBCH in the DwPTS of the special subframe.

The terminal device 1 may transmit the PRACH and the SRS in the UpPTS of the special subframe. The terminal device 1 may not transmit the PUCCH, the PUSCH, and the DMRS in the UpPTS of the special subframe.

When the special subframe is configured to include only the GP and the UpPTS, the terminal device 1 may transmit the PUCCH and/or the PUSCH and/or the DMRS in the UpPTS of the special subframe.

The terminal device 1 monitors a set of PDCCH candidates and/or the EPDCCH candidates. Hereinafter, to facilitate the description, the PDCCH includes the EPDCCH. The PDCCH candidates refer to candidates to which the PDCCH is likely to be mapped by the base station device 3 and which are likely to be transmitted by the base station device 3. The PDCCH candidates are configured to include one Control Channel Element (CCE) or a plurality of control channel elements. The monitoring means that the terminal device 1 attempts to decode each PDCCH in the PDCCH candidate set according to all the DCI formats to be monitored.

Here, the PDCCH candidate set monitored by the terminal device 1 is also referred to as a search space. The search space is a resource set which is likely to be used to transmit the PDCCH by the base station device 3. In the PDCCH region, a Common Search Space (CSS) and a UE-specific Search Space (USS) are configured (defined or set).

The CSS is used to transmit downlink control information for the plurality of terminal devices 1. That is, the CSS is defined in accordance with common resources for the plurality of terminal devices 1. The USS is used to transmit downlink control information for the certain specific terminal device 1. That is, the USS is defined in accordance with dedicated resources for the certain specific terminal device 1.

The terminal device 1 monitors the PDCCH in the CSS and/or the USS of the PDCCH region and detects the PDCCH destined for the own device.

To transmit the downlink control information (to transmit the PDCCH), RNTI assigned to the terminal device 1 by the base station device 3 is used. Specifically, Cyclic Redundancy Check (CRC) parity bit are attached to the DCI format (the downlink control information may be used) and the CRC parity bits are scrambled by the RNTI after the attachment.

The terminal device 1 attempts to decode the DCI format to which the CRC parity bits scrambled by the RNTI are attached and detects the DCI format for which the CRC succeed as the DCI format destined for the own device (which is referred to as blind decoding). That is, the terminal device 1 attempts to decode the PDCCH with the CRC scrambled by the RNTI and detects the PDCCH for which the CRC succeeds as the PDCCH destined for the own device.

Here, the RNTI includes a Cell-Radio Network Temporary Identifier (C-RNTI). The C-RNTI is a unique identifier used for RRC connection and scheduling identification. The C-RNTI is used for dynamically scheduled unicast transmission.

The RNTI further includes a temporary C-RNTI. The temporary C-RNTI is an identifier used for a random access procedure. For example, the terminal device 1 may decode the DCI format to which the CRC scrambled by the temporary C-RNTI is attached, in the common search space.

The random access procedure includes two random access procedures, that is, a contention-based random access procedure and a non-contention-based random access procedure. The contention-based random access procedure is random access in which there is a possibility of collision occurring between the plurality of terminal devices 1.

The non-contention-based random access procedure is random access in which no collision occurs between the plurality of terminal devices 1. For example, in the non-contention-based random access procedure, the base station device 3 can assign a random access preamble to the terminal devices 1 so that no collision occurs.

The random access procedure according to the embodiment is the contention-based random access procedure. An example of the contention-based random access procedure will be described.

The terminal device 1 acquires system information block type 2 (SIB 2) transmitted by the base station device 3. SIB 2 is a common configuration (common information) for all of the terminal devices 1 (or the plurality of terminal devices 1) in the cell. For example, the common configuration includes configuration of the PRACH.

The terminal device 1 selects a random access preamble number at random. The terminal device 1 transmits the random access preamble (message 1) of the selected number to the base station device 3 by using the PRACH. The base station device 3 estimates an uplink transmission timing using the random access preamble.

The base station device 3 transmits a random access response (message 2) using the PDSCH. The random access response includes a plurality of pieces of information regarding the random access preamble detected by the base station device 3. For example, the plurality of pieces of information include a random access preamble number, a temporary C-RNTI, a Timing Advance (TA) command, and a random access response grant.

The terminal device 1 transmits (initially transmits) uplink data (message 3) on the PUSCH scheduled using the random access response grant. The uplink data includes an identifier (information indicating Initial UE-Identity or the C-RNTI) for identifying the terminal device 1.

When the base station device 3 fails in decoding of uplink data, the base station device 3 gives an instruction to retransmit the uplink data using the DCI format to which the CRC parity bits scrambled by the temporary C-RNTI are attached. When the terminal device 1 is instructed to retransmit the uplink data in accordance with the DCI format, the terminal device 1 retransmits the same uplink data with the PUSCH scheduled using the DCI format to which the CRC parity bits scrambled by the temporary C-RNTI are attached.

When the base station device 3 fails in decoding of uplink data, the base station device 3 can give an instruction to retransmit the uplink data using the PHICH (NACK). When the terminal device 1 is instructed to retransmit the uplink data in accordance with the NACK, the terminal device 1 retransmits the same uplink data with the PUSCH.

When the base station device succeeds in decoding of the uplink data and acquires the uplink data, the base station device can know which terminal device 1 transmits the random access preamble and the uplink data. That is, before the base station device 3 succeeds in the decoding of the uplink data, the base station device 3 cannot know which terminal device 1 transmits the random access preamble and the uplink data.

When the base station device 3 receives message 3 including the Initial UE-Identity, the base station device 3 transmits a contention resolution identity (message 4) generated based on the received Initial UE-Identity to the terminal device 1 by using the PDSCH. When the received contention resolution identity matches the transmitted Initial UE-Identity, the terminal device 1 considers contention resolution of the random access preamble to be successful (1), sets a value of the temporary C-RNTI in the C-RNTI (2), destroys the temporary C-RNTI (3), and considers that the random access procedure is correctly completed (4).

When the base station device 3 receives message 3 including the information indicating the C-RNTI, the base station device 3 transmits the DCI format (message 4) to which the CRC parity bits scrambled by the received C-RNTI are attached, to the terminal device 1. When the terminal device 1 decodes the DCI format to which the CRC parity bits scrambled by the C-RNTI are attached, the terminal device 1 considers the contention resolution of the random access preamble to be successful (1), destroys the temporary C-RNTI (2), and considers the random access procedure is correctly competed (3).

That is, the base station device 3 schedules the PUSCH using the random access response grant as part of the contention-based random access procedure.

The terminal device 1 transmits uplink data (message 3) on the PUSCH scheduled using the random access response grant. That is, the terminal device 1 performs transmission on the PUSCH corresponding to the random access response grant as part of the contention-based random access procedure.

The base station device 3 schedules the PUSCH using the DCI format to which the CRC scrambled by the temporary C-RNTI is attached, as part of the contention-based random access procedure. The base station device 3 performs scheduling/instruction of transmission on the PUSCH using the PHICH (NACK) as part of the contention-based random access procedure.

The terminal device 1 transmits (retransmits) uplink data (message 3) on the PUSCH scheduled using the DCI format to which the CRC scrambled by the temporary C-RNTI is attached. The terminal device 1 transmits (retransmits) the uplink data (message 3) on the PUSCH scheduled in response to the reception of the PHICH. That is, the terminal device 1 performs transmission on the PUSCH corresponding to the retransmission of the same uplink data (transport block) as part of the contention-based random access procedure.

Figure 7:
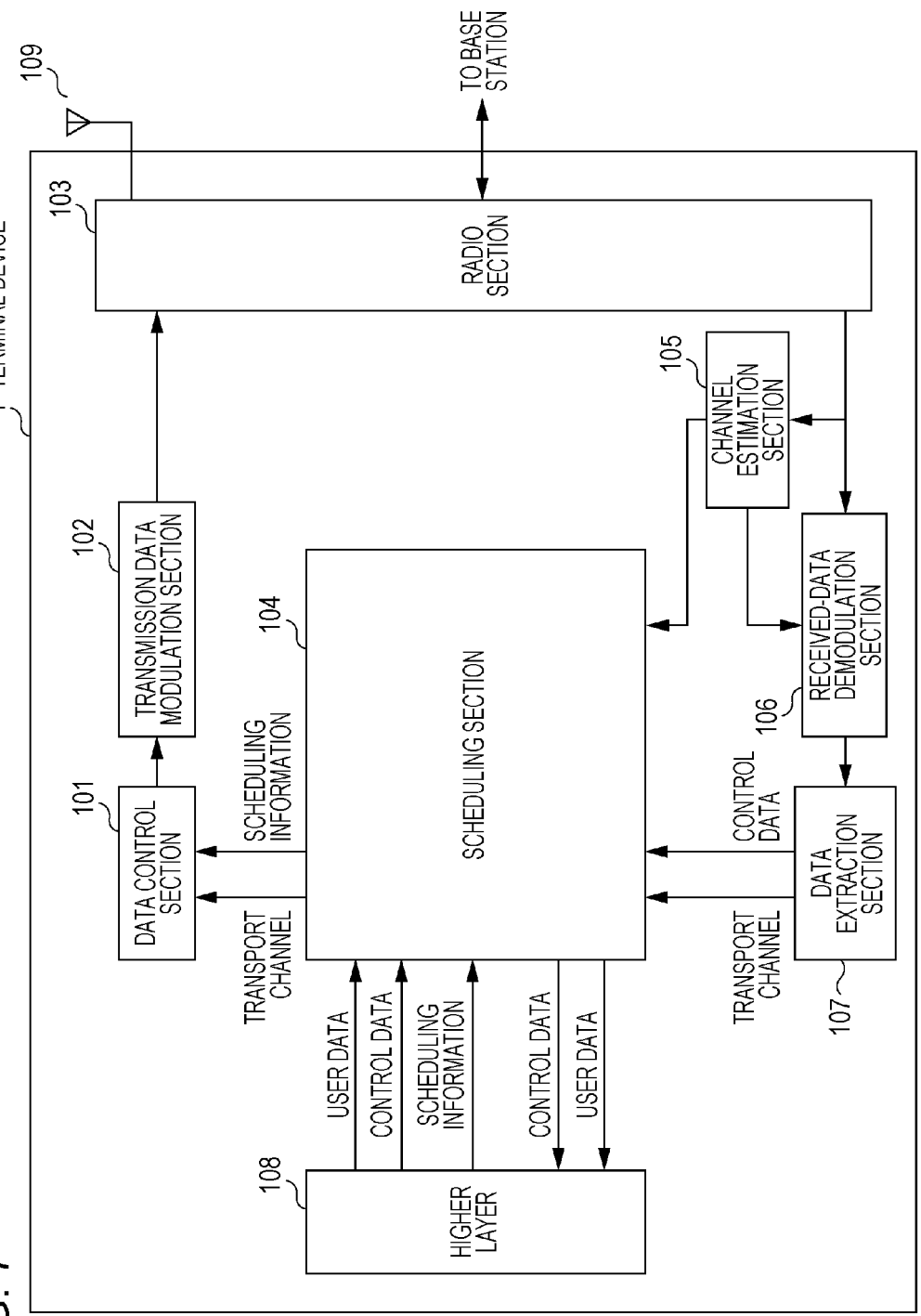
FIG. 7 is a schematic block diagram illustrating the structure of a terminal device 1 according to the embodiment.

FIG. 7 is a schematic block diagram illustrating the structure of the terminal device 1 according to the embodiment. The terminal device 1 includes a data control section 101, a transmission data modulation section 102, a radio section 103, a scheduling section 104, a channel estimation section 105, a received-data demodulation section 106, a data extraction section 107, a higher layer 108 (also referred to as a higher layer processing section), and an antenna 109. A transmission section is configured by the data control section 101, the transmission data modulation section 102, the radio section 103, the scheduling section 104, the higher layer 108, and the antenna 109. A reception section is configured by the radio section 103, the scheduling section 104, the channel estimation section 105, the received-data demodulation section 106, the data extraction section 107, the higher layer 108, and the antenna 109. Here, each section included in the terminal device 1 is also referred to as a unit.

The data control section 101 receives transport channels from the scheduling section 104. The data control section 101 maps the transport channels and signals generated in the physical layer to the physical channels based on scheduling information input from the scheduling section 104. Each piece of the mapped data is output the transmission data modulation section 102.

The transmission data modulation section 102 modulates/codes transmission data. The transmission data modulation section 102 performs modulation/coding on the data input from the data control section 101 and performs signal processing such as serial/parallel conversion, an IFFT process, and CP insertion on an input signal to generate transmission data and outputs the transmission data to the radio section 103.

The radio section 103 upconverts the transmission data input from the transmission data modulation section 102 to a radio frequency to generate a radio signal and transmits the radio signal to the base station device 3 via the antenna 109. The radio section 103 receives a radio signal received from the base station device 3 via the antenna 109, downconverts the radio signal to a baseband signal, and outputs the received data to the channel estimation section 105 and the received-data demodulation section 106.

The scheduling section 104 performs mapping of logic channels and the transport channels and downlink and uplink scheduling. Since the scheduling section 104 collectively controls processing units of the physical layers, interfaces are present between the scheduling section 104, and the antenna 109, the data control section 101, the transmission data modulation section 102, the channel estimation section 105, the received-data demodulation section 106, the data extraction section 107, and the radio section 103.

In the downlink scheduling, the scheduling section 104 generates scheduling information or performs reception control in the transport channels and the physical channels based on, for example, downlink control information received from the base station device 3 or scheduling information input from the higher layer 108. The scheduling information used for the downlink scheduling is output to the data control section 101.

In uplink scheduling, the scheduling section 104 performs a scheduling process of mapping the uplink logic channels input from the higher layer 108 to the transport channels and generates scheduling information to be used for uplink scheduling based on, for example, the downlink control information received from the base station device 3 or scheduling information input from the higher layer 108. The scheduling information is output to the data control section 101.

The scheduling section 104 maps the uplink logic channels input from the higher layer 108 to the transport channels and outputs the mapping to the data control section 101. The scheduling section 104 also outputs channel state information input from the channel estimation section 105 or a confirmation result of the CRC parity bit (simply also referred to as the CRC) input from the data extraction section 107 to the data control section 101.

The scheduling section 104 determines timings at which a reception process and a transmission process are performed based on first configuration and/or second configuration and/or third configuration.

To demodulate downlink data, the channel estimation section 105 estimates a downlink channel state from a downlink reference signal (for example, the DMRS) and outputs the downlink channel state to the received-data demodulation section 106. The received-data demodulation section 106 demodulates the received data input from the radio section 103 and outputs the demodulated data to the data extraction section 107.

The data extraction section 107 confirms that the received data input from the received-data demodulation section 106 is correct or incorrect and outputs a confirmation result (for example, an ACK or a NACK) to the scheduling section 104. The data extraction section 107 separates the received data input from the received-data demodulation section 106 into the transport channels and the control data of the physical layer and outputs the transport channels and the control data to the scheduling section 104.

The higher layer 108 performs a process for an RRC layer or a process for the MAC layer. Since the higher layer 108 collectively controls processing units of a lower layer, interfaces are present between the higher layer 108, and the scheduling section 104, the antenna 109, the data control section 101, the transmission data modulation section 102, the channel estimation section 105, the received-data demodulation section 106, the data extraction section 107, and the radio section 103.

The higher layer 108 manages the first configuration, the second configuration, and the third configuration. That is, the first configuration is set based on the first information received from the base station device, the second configuration is set based on the second information received from the base station device, and the third configuration is set based on the second information.

Figure 8:
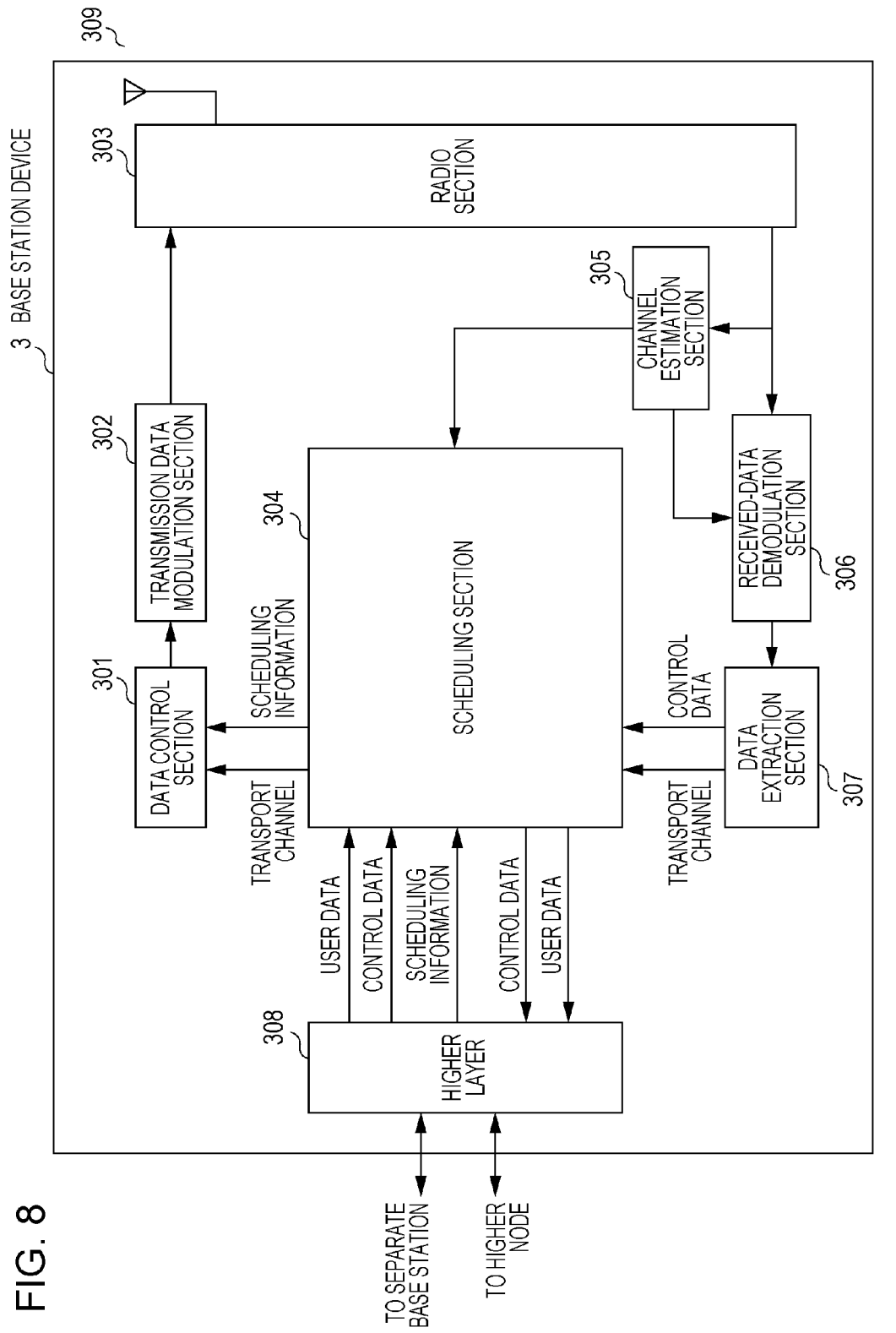
FIG. 8 is a schematic block diagram illustrating the structure of a base station device 3 according to the embodiment.

FIG. 8 is a schematic block diagram illustrating the structure of the base station device 3 according to the embodiment. The base station is configured to include a data control section 301, a transmission data modulation section 302, a radio section 303, a scheduling section 304, a channel estimation section 305, a received-data demodulation section 306, a data extraction section 307, a higher layer 308 (also referred to as a higher layer processing section), and an antenna 309. A reception section is configured by the radio section 303, the scheduling section 304, the channel estimation section 305, the received-data demodulation section 306, the data extraction section 307, the higher layer 308, and the antenna 309. A transmission section is configured by the data control section 301, the transmission data modulation section 302, the radio section 303, the scheduling section 304, the higher layer 308, and the antenna 309. Here, each section included in the base station is also referred to as a unit.

The data control section 301 receives the transport channels from the scheduling section 304. The data control section 301 maps the transport channels and signals generated in the physical layer to the physical channels based on scheduling information input from the scheduling section 304. Each piece of the mapped data is output the transmission data modulation section 302.

The transmission data modulation section 302 modulates/codes transmission data. The transmission data modulation section 302 performs modulation/coding on the data input from the data control section 301 and performs signal processing such as serial/parallel conversion, an Inverse Fast Fourier Transform (IFFT) process, and Cyclic Prefix (CP) insertion on an input signal based on, for example, the scheduling information from the scheduling section 304 to generate transmission data and outputs the transmission data to the radio section 303.

The radio section 303 upconverts the transmission data input from the transmission data modulation section 302 to a radio frequency to generate a radio signal and transmits the radio signal to the terminal device 1 via the antenna 309. The radio section 303 receives a radio signal received from the terminal device 1 via the antenna 309, downconverts the radio signal to a baseband signal, and outputs the received data to the channel estimation section 105 and the received-data demodulation section 106.

The scheduling section 304 performs mapping of logic channels and the transport channels and downlink and uplink scheduling. Since the scheduling section 304 collectively controls processing units of the physical layers, interfaces are present between the scheduling section 304, and the antenna 309, the radio section 303, the channel estimation section 305, the received-data demodulation section 306, the data control section 301, the transmission data modulation section 302, and the data extraction section 307.

In the downlink scheduling, the scheduling section 304 generates scheduling information or performs transmission control in the transport channels and the physical channels based on, for example, uplink control information received from the terminal device 1 or scheduling information input from the higher layer 308. The scheduling information used for the downlink scheduling is output to the data control section 301.

In uplink scheduling, the scheduling section 304 generates scheduling information based on, for example, the uplink channel state output by the channel estimation section 305 or the scheduling information input from the higher layer 308. The scheduling information used for the uplink scheduling is output to the data control section 301.

The scheduling section 304 maps the downlink logic channels input from the higher layer 308 to the transport channels and outputs the mapping to the data control section 301. The scheduling section 304 processes the uplink transport channels and the control data input from the data extraction section 307, as necessary, subsequently maps the transport channels to the uplink logic channels, and outputs the mapping to the higher layer 308.

The scheduling section 304 generates information to be used for scheduling of the physical channels (for example, the PDSCH and the PUSCH) based on the scheduling result. The scheduling section 304 determines timings at which a reception process and a transmission process are performed based on first configuration and/or second configuration and/or third configuration.

To demodulate uplink data, the channel estimation section 305 estimates an uplink channel state from an uplink reference signal (for example, the DMRS) and outputs the uplink channel state to the received-data demodulation section 306. To perform the uplink scheduling, the channel estimation section 305 estimates the uplink channel state from the uplink reference signal (for example, the SRS) and outputs the uplink channel state to the scheduling section 304.

The received-data demodulation section 306 demodulates the received data. The received-data demodulation section 306 performs a demodulation process by performing signal processing such as DFT conversion, subcarrier mapping, and IFFT conversion on modulated data input from the radio section 303 based on the estimation result of the uplink channel state input from the channel estimation section 305 and outputs a processing result to the data extraction section 307.

The data extraction section 307 confirms that the received data input from the received-data demodulation section 306 is correct or incorrect and outputs a confirmation result (for example, an ACK or a NACK) to the scheduling section 304. The data extraction section 307 separates the data input from the received-data demodulation section 306 into the transport channels and the control data of the physical layer and outputs the transport channels and the control data to the scheduling section 304.

The higher layer 308 performs a process for an RRC layer or a process for the MAC layer. Since the higher layer 308 collectively controls processing units of a lower layer, interfaces are present between the higher layer 308, and the scheduling section 304, the antenna 309, the radio section 303, the channel estimation section 305, the received-data demodulation section 306, the data control section 301, the transmission data modulation section 302, and the data extraction section 307.

The higher layer 308 manages the first configuration, the second configuration, and the third configuration on each of the terminal devices 1. The higher layer 308 generates first information indicating the first configuration, second information indicating the second configuration, and third information indicating the third configuration.

Here, the base station device 3 may decide the first configuration and/or the second configuration and/or the third configuration on the terminal device 1. The base station device 3 may be instructed to perform the first configuration and/or the second configuration and/or the third configuration on the terminal device 1 from a higher node. For example, the higher layer 108 may decide the first configuration, the second configuration, and the third configuration based on an amount of uplink traffic and an amount of downlink traffic.

The first configuration, the second configuration, and the third configuration will be described. In the following description, the terminal device 1 is assumed to perform a normal HARQ operation. That is, the terminal device 1 can support a subframe bundling operation. However, an operation to be described below is applied when a normal HARQ operation is performed.

The terminal device 1 sets the first configuration and/or the second configuration and/or the third configuration. For example, the first configuration and/or the second configuration and/or the third configuration may be defined based on uplink-downlink configuration.

FIG. 9 is a table illustrating an example of the uplink-downlink configuration. In FIG. 9, D denotes a downlink subframe. U denotes an uplink subframe. S denotes a special subframe.

For example, as illustrated in FIG. 9, subframe 1 in the radio subframe is always defined as a special subframe. Subframes 0 and 5 in the radio subframe are always defined as downlink subframes. Subframe 2 in the radio subframe is always defined as an uplink subframe.

When a downlink-uplink point periodicity is 5 ms, subframe 6 in the radio frame is defined as a special subframe. When the downlink-uplink switch point periodicity is 10 ms, subframe 6 in the radio frame is defined as a downlink subframe.

That is, the uplink-downlink configuration may be a configuration regarding a pattern of the subframes in the radio frame. The uplink-downlink configuration may be a configuration regarding the structure of a subframe in the radio frame. That is, the uplink-downlink configuration may be a configuration related to the structure of a radio frame formed by a downlink subframe, an uplink subframe, and a special subframe.

The first configuration will be described. For example, the first configuration may be used to specify correspondence (hereinafter, "specify" includes meanings of at least "select", "decide", and "indicate") between subframe n in which the PDCCH/EPDCCH/PHICH is allocated and subframe n+k in which the PUSCH corresponding to the PDCCH/EPDCCH/PHICH is allocated.

The first configuration may be used to specify correspondence between subframe n in which the PHICH is allocated and subframe n−k in which the PUSCH corresponding to the PHICH is allocated. The first configuration may be used to specify correspondence between subframe n in which the PUSCH is allocated and subframe n+k in which the PHICH corresponding to the PUSCH is allocated.

The first configuration may be used to specify an HARQ timing for uplink data. That is, the first configuration may be used to specify a transmission timing (or a reception timing) of the HARQ indicator (the PHICH).

The first configuration may be used to specify a subframe for monitoring an uplink grant (the PDCCH/EPDCCH accompanied with the uplink grant may be used). Here, the PDCCH/EPDDCH accompanied with the uplink grant includes a meaning of the PDCCH/EPDDCH used to transmit the uplink grant.

That is, the first configuration may be used to specify a subframe in which an uplink signal can be transmitted. When scheduling is performed by the base station device 3, the terminal device 1 transmits the uplink signal in a subframe specified based on the first configuration. The first configuration may be used to specify a transmission timing of the uplink signal.

The first configuration may be used to specify a subframe for transmitting the uplink signal. That is, the first configuration may be used to specify a subframe for performing transmission on the PUSCH. The first configuration may be used to specify a subframe for transmitting the SRS.

The first configuration may be used to specify a subframe in which the uplink signal can be scheduled. The first configuration may be used to specify a subframe in which the uplink signal can be set.

FIG. 10 is a diagram for describing the first configuration. In FIG. 10, uplink-downlink configurations 0 to 6 are described as the first configuration. FIG. 10 illustrates correspondence between subframe n in which the PDCCH/EPDCCH/PHICH are allocated and subframe n+k in which the PUSCH corresponding to the PDCCH/EPDCCH/PHICH is allocated.

The terminal device 1 specifies the value of k based on the table illustrated in FIG. 10. Here, subframe n and subframe n+k are subframes intended for the terminal device 1 (on the side of the terminal device 1).

For example, when the PDCCH/EPDDCH accompanied with the uplink grant in subframe n is detected, the terminal device 1 in which uplink-downlink configurations 1 to 6 are set transmits the PUSCH corresponding to the uplink grant in subframe n+k specified based on the table of FIG. 10. Here, the transmission of the PUSCH corresponding to the uplink grant includes a meaning of transmission with the PUSCH scheduled using the uplink grant. The fact that the transmission is performed includes a meaning of adjustment of the transmission with the PUSCH.

When the transmission with the PHICH in subframe n is detected, the terminal device 1 in which uplink-downlink configurations 1 to 6 are set performs transmission with the PUSCH corresponding to the PHICH in subframe n+k specified based on the table of FIG. 10.

Here, the uplink grant transmitted to the terminal device 1 in which uplink-downlink configuration 0 is set includes a 2-bit uplink index (UL index).

When the PDCCH/EPDDCH accompanied with the uplink grant is detected and the Most Significant Bit (MSB) of the uplink index included in the uplink grant is set to 1, the terminal device 1 in which uplink-downlink configuration 0 is set performs the transmission with the PUSCH corresponding to the uplink grant in subframe n+k specified based on the table of FIG. 10.

When the PHICH in the first resource set of subframe n=0 or 5 is received, the terminal device 1 in which uplink-downlink configuration 0 is set performs transmission with the PUSCH corresponding to the PHICH in subframe n+k specified based on the table of FIG. 10.

When the Least Significant Bit (LSB) of the uplink index included in the uplink grant in subframe n is set to 1, the terminal device 1 in which uplink-downlink configuration 0 is set performs the transmission with the PUSCH corresponding to the uplink grant in subframe n+7.

When the PHICH in the second resource set of subframe n=0 or 5 is received or when the PHICH in subframe n=1 or 6 is received, the terminal device 1 in which uplink-downlink configuration 0 is set performs transmission with the PUSCH corresponding to the uplink grant in subframe n+7.

For example, when the PDCCH/EPDCCH/PHICH is detected in [SFN=m, subframe 1], the terminal device 1 in which uplink-downlink configuration 0 is set performs transmission with the PUSCH in subframe [SFN=m, subframe 7] after 6 subframes.

FIG. 11 is another diagram for describing the first configuration. In FIG. 11, uplink-downlink configurations 0 to 6 are described as the first configuration. FIG. 11 illustrates correspondence between subframe n in which the PHICH is allocated and subframe n−k in which the PUSCH corresponding to the PHICH is allocated.

The terminal device 1 specifies the value of k based on the table illustrated in FIG. 11. Here, subframe n and subframe n−k are subframes intended for the terminal device 1 (on the side of the terminal device 1).

For example, when uplink-downlink configuration 0 is set in the terminal device 1, the HARQ-ACK (the HARQ indicator may be used) received with the PHICH allocated to the terminal device 1 in subframe n is related to the transmission with the PUSCH in subframe n−k specified based on the table of FIG. 11.

When uplink-downlink configuration 0 is set in the terminal device 1, the first resource set in subframe n=0 or 5 or the HARQ-ACK received with the PHICH allocated to the terminal device 1 in subframe n=1 to 6 is related to the transmission with the PUSCH in subframe n−k specified based on the table of FIG. 11.

When uplink-downlink configuration 0 is set in the terminal device 1, the HARQ-ACK received with the PHICH allocated to the terminal device 1 in the second resource set in subframe n=0 or 5 is related to the transmission with the PUSCH in subframe n−6.

For example, in the terminal device 1 in which uplink-downlink configuration 1 is set, the HARQ-ACK received with the PHICH in [SFN=m, subframe 1] is related to the transmission with the PUSCH in subframe [SFN=m−1, subframe 7] before 4 subframes.

FIG. 12 is a further another diagram for describing the first configuration. In FIG. 12, uplink-downlink configurations 0 to 6 are described as the first configuration. FIG. 12 illustrates correspondence between subframe n in which the PUSCH is allocated and subframe n+k in which the PUSCH corresponding to the PHICH is allocated.

The terminal device 1 specifies the value of k based on the table illustrated in FIG. 12. Here, subframe n and subframe n+k are subframes intended for the terminal device 1 (on the side of the terminal device 1). When the transmission with the PUSCH in subframe n is scheduled, the terminal device 1 decides the PHICH resource in subframe n+k specified from the table of FIG. 12.

For example, when the transmission with the PUSCH in [SFN=m, subframe n=2] is scheduled, the terminal device 1 in which uplink-downlink configuration 0 is set decides the PHICH resource in [SFN=m, subframe n=6].

When the transmission with the PUSCH in [SFN=m, subframe n=3] is scheduled, the terminal device 1 in which uplink-downlink configuration 0 is set decides the PHICH resource in the first source set in [SFN=m+1, subframe n=0].

When the transmission with the PUSCH in [SFN=m, subframe n=4] is scheduled, the terminal device 1 in which uplink-downlink configuration 0 is set decides the PHICH resource in the second source set in [SFN=m+1, subframe n=0].

When the transmission with the PUSCH in [SFN=m, subframe n=7] is scheduled, the terminal device 1 in which uplink-downlink configuration 0 is set decides the PHICH resource in [SFN=m+1, subframe n=1].

When the transmission with the PUSCH in [SFN=m, subframe n=8] is scheduled, the terminal device 1 in which uplink-downlink configuration 0 is set decides the PHICH resource in the first source set in [SFN=m+1, subframe n=5].

When the transmission with the PUSCH in [SFN=m, subframe n=9] is scheduled, the terminal device 1 in which uplink-downlink configuration 0 is set decides the PHICH resource in the second source set in [SFN=m+1, subframe n=5].

The second configuration will be described. For example, the second configuration may be used to specify correspondence between subframe n in which the PDSCH is allocated and subframe n+k in which the HARQ-ACK corresponding to the PDSCH is transmitted.

The second configuration may be used to specify an HARQ timing for downlink data. That is, the second configuration may be used to specify a transmission timing (or a reception timing) of the HARQ-ACK.

The second configuration may be used to specify a subframe for monitoring a downlink assignment (the PDCCH/EPDCCH accompanied with the downlink assignment may be used). Here, the PDCCH/EPDDCH accompanied with the downlink assignment includes a meaning of the PDCCH/EPDDCH used to transmit the downlink assignment.

The second configuration may be used to specify a subframe in which a downlink signal can be transmitted. The second configuration may be used to specify the subframe in which transmission or reception on the PDSCH is performed.

The second configuration may be used to specify the subframe in which the downlink signal can be transmitted. When the scheduling is performed by the base station device 3, the terminal device 1 can receive the downlink signal in the subframe specified based on the second configuration (the downlink signal can be considered to be transmitted). The second configuration may be used to specify a transmission timing of the downlink signal.

The second configuration may be used to specify whether to perform a process of receiving the downlink signal and/or the downlink physical channel in the subframe in which the downlink signal and/or the downlink physical channel is scheduled and/or set.

FIG. 13 is a diagram for describing the second configuration. In FIG. 13, uplink-downlink configurations 0 to 6 are described as the second configuration. FIG. 13 illustrates correspondence between subframe n−k in which the PDSCH is allocated and subframe n in which the HARQ-ACK corresponding to the PDSCH is transmitted.

The terminal device 1 specifies the value of k based on the table illustrated in FIG. 13. Here, subframe n−k and subframe n are subframes intended for the terminal device 1 (on the side of the terminal device 1). When the transmission on the PDSCH in which the corresponding HARQ-ACK is transmitted is detected in subframe n−k, the terminal device 1 transmits the HARQ-ACK in subframe n.

For example, the terminal device 1 transmits the HARQ-ACK for the transmission on the PDSCH scheduled using the DCI format to which the CRC parity bits scrambled by the C-RNTI are attached.

For example, the terminal device 1 in which the uplink-downlink configuration 1 is set transmits the HARQ-ACK for the transmission on the PDSCH received in subframe n−6 and/or n−7 in subframe n=2.

The third configuration will be described. Here, when the terminal device 1 decides a transmission direction (uplink or downlink) based on the first configuration, the second configuration, and the scheduling information (for example, the DCI format or the HARQ indicator (the PHICH)), a problem occurs in that the terminal device 1 erroneously receiving/decoding the scheduling information transmits an uplink signal.

For example, a problem occurs in that the terminal device 1 erroneously receiving/decoding the scheduling information transmits an uplink signal in a subframe with which the base station device 3 transmits a downlink signal to another terminal device 1, and thus the uplink signal interferes with the downlink signal.

The third configuration may be used to specify a transmission direction (uplink or downlink) in the subframe. The third configuration may be used to specify the subframe for which transmission of an uplink signal is permitted. The third configuration may be used to specify the subframe for which transmission of an uplink signal in the UpPTS is permitted.

For example, the third configuration may be used to specify the subframe for which transmission on the PUSCH is permitted. The third configuration may be used to specify the subframe for which transmission of the SRS is permitted.

The third configuration may be used to specify the subframe for which transmission of a downlink signal is permitted. The third configuration may be used to specify the subframe for which transmission of a downlink signal in the DwPTS is permitted. For example, the third configuration may be used to specify the subframe for which transmission (or reception) on the PDSCH is permitted. The third configuration may be used to specify the subframe for which transmission of a downlink signal in the GP and the UpPTS is permitted.

The third configuration may be used to specify whether transmission of an uplink signal in a flexible subframe is permitted. That is, the third configuration may be used to specify the flexible subframe for which transmission of the uplink signal is permitted.

The third configuration may be used to specify whether transmission of a downlink signal in the flexible subframe is permitted. That is, the third configuration may be used to specify the flexible subframe for which transmission of a downlink signal is permitted. Here, the flexible subframe will be described below.

In the third configuration, the transmission direction may be used to specify which configuration complies between the first configuration and the second configuration. The third configuration may indicate whether the subframe with which transmission of an uplink signal can be transmitted is specified based on either the first configuration or the second configuration. The terminal device 1 specifies the subframe with which the transmission of the uplink signal can be transmitted based on the first configuration or the second configuration specified in accordance with the third configuration.

The third configuration may indicate which subframe is specified to monitor a downlink signal based on either the first configuration or the second configuration. The terminal device 1 specifies the subframe used to monitor the downlink signal based on the first configuration or the second configuration specified in accordance with the third configuration.

The third configuration may not be used for the PUSCH transmission corresponding to a random access response grant or a retransmission of the same transport block as part of the contention-based random access procedure.

That is, the third configuration may be used unless the PUSCH transmission corresponds to a random access response grant or retransmission of the same transport block as part of the contention-based random access procedure.

The third configuration may not be used for the PUSCH transmission scheduled using the DCI format to which the CRC parity bits scrambled by the C-RNTI are attached or may be used for the PUSCH transmission corresponding to the retransmission of the same transport block based on the HARQ indicator (the PHICH).

The third configuration may be used only for the PUSCH transmission (or reception) corresponding to the HARQ indicator (the PHICH) which is not part of the contention-based random access procedure.

The base station device 3 may transmit first information indicating the first configuration (the first information indicating a first parameter may be used) to the terminal device 1. The base station device 3 may transmit second information indicating the second configuration (the second information indicating a second parameter may be used) to the terminal device 1. The base station device 3 may transmit third information indicating the third configuration (the third information indicating a third parameter may be used) to the terminal device 1.

For example, the base station device 3 may transmit the first information that is included in at least one of the master information block, the system information block type 1 message, the system information message, the RRC message, the MAC CE, and the control information (for example, the DCI format) in the physical layer. For example, the first information is preferably included in the system information block type 1 message. The first information is preferably common to the plurality of terminal devices 1 in the cell.

The base station device 3 may transmit the second information that is included in at least one of the master information block, the system information block type 1 message, the system information message, the RRC message, the MAC CE, and the control information (for example, the DCI format) in the physical layer. For example, the second information is preferably included in the system information block type 1 message, the system information message, or the RRC message. The second information may be common to the plurality of terminal devices 1 in the cell or may be dedicated to a certain terminal device.

The base station device 3 may transmit the third information that is included in at least one of the master information block, the system information block type 1 message, the system information message, the RRC message, the MAC CE, and the control information (for example, the DCI format) in the physical layer. For example, the third information is preferably included in the master information block, the MAC CE, or the control information (for example, the DCI format) in the physical layer. The third information may be common to the plurality of terminal devices 1 in the cell or may be dedicated to a certain terminal device.

The third configuration (the third information may be used) may also be defined using at least 1-bit information. The third configuration (the third information may be used) may be referred to as a third instruction.

The base station device 3 may transmit the DCI format (hereinafter also referred to as DCI format 6) including the third information, to which dedicated CRC parity bits (hereinafter also referred to as a DTDD-CRC: Dynamic TDD-CRC) are attached. Here, the DTDD-CRC is defined (reserved) only for transmission of the third information based on a specification or the like. The base station device 3 can assign the DTDD-CRC to the terminal device 1.

DCI format 6 may include a plurality of pieces of the third information destined for the plurality of terminal devices 1. The base station device 3 may transmit DCI format 6 in the CSS. The base station device 3 may also transmit DCI format 6 in the USS.

The base station device 3 may include information (index) indicating a field (the position of a field) of DCI format 6 in which the third information destined for the terminal device 1 is set in a signal of a higher layer (for example, dedicated signaling) to transmit the information.

The base station device 3 may include the third information in the downlink assignment to transmit the third information. The base station device 3 may include the third information in the uplink grant to transmit the third information. The terminal device 1 detects DCI format 6 to which the CRC parity bits scrambled by the DTDD-RNTI are attached and sets the third configuration based on the third information.

Here, the first configuration may also be referred to as an uplink reference configuration. The first configuration may also be referred to as an uplink reference uplink-downlink configuration.

The second configuration may also be referred to as a downlink reference configuration. The second configuration may also be referred to as a downlink reference uplink-downlink configuration.

The terminal device 1 may set the first configuration based on the first information. The terminal device 1 may set the first configuration as the uplink reference configuration based on the first information. The terminal device 1 may set the first configuration as the uplink reference uplink-downlink configuration based on the first information.

The terminal device 1 may set the second configuration based on the second information. The terminal device 1 may set the second configuration as the downlink reference configuration based on the second information. The terminal device 1 may set the second configuration as the downlink reference uplink-downlink configuration based on the second information.

The terminal device 1 may set the third configuration based on the third information. Here, the terminal device 1 setting the second configuration may also be referred to as the terminal device 1 in which the dynamic TDD is set.

FIG. 14 is a diagram illustrating a relation between the subframes indicated using the first configuration, the second configuration, and the third configuration. In FIG. 14, D denotes a downlink subframe, U denotes an uplink subframe, and S denotes a special subframe.

As illustrated in FIG. 14(*a*), the subframe which is indicated as the downlink subframe in accordance with the first configuration and is indicated as the downlink subframe in accordance with the second configuration may also be indicated as the downlink subframe in accordance with the third configuration.

As illustrated in FIG. 14(*b*), the subframe which is indicated as the uplink subframe in accordance with the first configuration and is indicated as the uplink subframe in accordance with the second configuration may also be indicated as the uplink subframe in accordance with the third configuration.

As illustrated in FIG. 14(*c*), the subframe which is indicated as the uplink subframe in accordance with the first configuration and is indicated as the downlink subframe in accordance with the second configuration may also be indicated as the uplink subframe or the downlink subframe in accordance with the third configuration.

As illustrated in FIG. 14(d), the subframe which is indicated as the special subframe in accordance with the first configuration and is indicated as the special subframe in accordance with the second configuration may also be indicated as the special subframe in accordance with the third configuration.

As illustrated in FIG. 14(e), the subframe which is indicated as the special subframe in accordance with the first configuration and is indicated as the downlink subframe in accordance with the second configuration may also be indicated as the special subframe or the downlink subframe in accordance with the third configuration.

Here, the subframe which is indicated as the uplink subframe in accordance with the third configuration or the UpPTS of the subframe which is indicated as the special subframe in accordance with the third configuration is also referred to as a first subframe.

Further, the subframe which is indicated as the downlink subframe in accordance with the third configuration or the DwPTS of the subframe which is indicated as the special subframe in accordance with the third configuration is also referred to as a second subframe.

For example, the base station device 3 may schedule transmission of the uplink signal in the first subframe. The base station device 3 may schedule transmission of the downlink signal in the first subframe.

The base station device 3 may schedule transmission of the downlink signal in the second subframe.

When the transmission of the uplink signal is not scheduled in the first subframe, the terminal device 1 may receive a downlink signal.

The terminal device 1 may receive the downlink signal in the second subframe. The terminal device 1 may monitor the PDCCH/EPDCCH in the second subframe. When the downlink assignment is detected in the second subframe, the terminal device 1 may perform reception on the PDSCH corresponding to the downlink assignment in the second subframe.

Here, the subframe which is indicated as the uplink subframe in accordance with the first configuration and is indicated as the uplink subframe in accordance with the second configuration is also referred to as a fixed uplink subframe.

The subframe which is indicated as the downlink subframe in accordance with the first configuration and is indicated as the downlink subframe in accordance with the second configuration is also referred to as a fixed downlink subframe.

The subframe which is indicated as the special subframe in accordance with the first configuration and is indicated as the special subframe in accordance with the second configuration is also referred to as a fixed special subframe.

The subframe which is indicated as the uplink subframe in accordance with the first configuration and is indicated as the downlink subframe in accordance with the second configuration is also referred to as a first flexible subframe. The subframe which is indicated as the special subframe in accordance with the first configuration and is indicated as the downlink subframe in accordance with the second configuration is also referred to as a second flexible subframe. The first flexible subframe and the second flexible subframe are also collectively referred to as the flexible subframes.

The flexible subframe may be used for transmission of the uplink signal and/or transmission of the downlink signal based on the DCI format transmitted by the base station device 3 and the third configuration.

Hereinafter, an operation of the terminal device 1 will be described basically, but the base station device 3, of course, performs the same operation to correspond to the operation of the terminal device 1.

The terminal device 1 may perform the PUSCH transmission in the subframe which is the fixed uplink subframe and in which the PUSCH is scheduled using the uplink grant. Further, the terminal device 1 may perform the PUSCH transmission in the subframe which is the fixed uplink subframe and corresponds to the HARQ indicator (the PHICH).

That is, the terminal device 1 may perform the PUSCH transmission in the fixed uplink subframe, irrespective of the third configuration. The terminal device 1 may not receive (monitor) the third configuration (which may be the third information) for the fixed uplink subframe. For example, the terminal device 1 may not monitor the DCI format including the third information for the fixed uplink subframe.

The terminal device 1 may perform the PUSCH transmission in the subframe which is the fixed uplink subframe and is permitted for transmission of the uplink signal in accordance with the third configuration and in which the PUSCH is scheduled using the uplink grant.

The terminal device 1 may perform the PUSCH transmission in the subframe which is the fixed uplink subframe and is permitted for transmission of the uplink signal in accordance with the third configuration and which corresponds to the HARQ indicator (the PHICH).

That is, the terminal device 1 may perform the PUSCH transmission in the fixed subframe based on the third configuration.

The terminal device 1 may perform the PUSCH transmission in the subframe which is the flexible subframe and is permitted for transmission of the uplink signal in accordance with the third configuration and in which the PUSCH is scheduled using the uplink grant.

The terminal device 1 may perform the PUSCH transmission in the subframe which is the flexible subframe and is permitted for transmission of the uplink signal in accordance with the third configuration and which corresponds to the HARQ indicator (the PHICH).

The terminal device 1 may transmit the first SRS when the subframes configured for transmission of the first SRS is the fixed uplink subframe.

The terminal device 1 may transmit the first SRS when the subframe configured for transmission of the first SRS is the fixed special subframe.

The terminal device 1 may transmit the first SRS when the subframes configured for transmission of the first SRS is the flexible subframe and the transmission of the uplink signal is permitted in accordance with the third configuration.

The terminal device 1 may transmit the second SRS when a positive SRS request is detected in subframe n and a first subframe satisfying the followings is the fixed uplink subframe:

n+k and k≥4; and configured by a higher layer (configured by using a signal of a higher layer).

The terminal device 1 may transmit the second SRS when a positive SRS request is detected in subframe n and the first subframe satisfying the followings is the fixed special subframe:

n+k and k≥4; and configured by a higher layer (configured by using a signal of a higher layer).

The terminal device 1 may transmit the second SRS when a positive SRS request is detected in subframe n and the first subframe satisfying the followings is the flexible subframe and the transmission of the uplink signal is permitted in accordance with the third configuration:

n+k (where k≥4); and configured by a higher layer (configured by using a signal of a higher layer).

The terminal device 1 may drop the PUSCH transmission when the transmission of the uplink signal is not permitted in accordance with the third configuration despite the subframe which is the flexible subframe and in which the PUSCH is scheduled using the uplink grant.

The terminal device 1 may drop the PUSCH transmission when the transmission of the uplink signal is not permitted in accordance with the third configuration despite the subframe which is the flexible subframe and which corresponds to the HARQ indicator (the PHICH).

The terminal device 1 may drop the transmission of the first SRS when the subframe configured for the transmission of the first SRS is the flexible subframe and the transmission of the uplink signal is not permitted in accordance with the third configuration.

The terminal device 1 may drop the transmission of the first SRS in the flexible subframe when the transmission of the uplink signal in the flexible subframe in which the transmission of the first SRS is configured is not permitted in accordance with the third configuration.

The terminal device 1 may drop the transmission of the first SRS when the subframe in which the transmission of the first SRS is configured is the fixed downlink subframe.

The terminal device 1 may drop the transmission of the second SRS when a positive SRS request is detected in subframe n and the first subframe satisfying the followings is the flexible subframe and the transmission of the uplink signal is not permitted in accordance with the third configuration:

n+k (where k≥4); and configured by a higher layer (configured by using a signal of a higher layer).

That is, the terminal device 1 may drop the transmission of the second SRS in the flexible subframe when the transmission of the uplink signal in the flexible subframe in which the transmission of the second SRS is scheduled is not permitted in accordance with the third configuration.

The terminal device 1 may drop the transmission of the second SRS when a positive SRS request is detected in subframe n and the first subframe satisfying the followings is the fixed downlink subframe:

n+k (where k≥4); and configured by a higher layer (configured by using a signal of a higher layer).

Here, the subframe configured by a higher layer (configured by using a signal of a higher layer) includes the subframe ($k_{SRS}$) satisfying Math. 1 below.

$$(10 \cdot n_f + k_{SRS} - T_{offset}) \bmod T_{SRS} = 0 \text{ for TDD with } T_{SRS} > 2$$

$$(k_{SRS} - T_{offset}) \bmod 5 = 0 \text{ for TDD with } T_{SRS} = 2 \qquad [\text{Math. 1}]$$

In Math. 1, $n_f$ denotes a radio frame number (SFN: System Frame Number). The $T_{SRS}$ denotes the periodicity (SRS periodicity) of the SRS subframes and $T_{offset}$ denotes the value of an offset of the SRS subframes and is configured using a signal of a higher layer by the base station device 3. Here, $k_{SRS}$ is defined in accordance with the table illustrated in FIG. 15.

The terminal device 1 calculates $k_{SRS}$ satisfying Math. 1 and decides the SC-FDMA symbol for transmitting the second SRS based on the calculated $k_{SRS}$ and the table illustrated in FIG. 15. For example, when the length of the UpPTS is 2 symbols, the terminal device 1 calculating "1" as $k_{SRS}$ satisfying Math. 1 transmits the second SRS by using the second symbol of the UpPTS in subframe index 1.

Here, the terminal device 1 may perform the PUSCH transmission, irrespective of the third configuration, as part of the contention-based random access procedure when transmission of the uplink data (message 3) is scheduled.

For example, irrespective of the third configuration of a certain subframe, the terminal device 1 may perform the PUSCH transmission corresponding to the random access response grant in the subframe as part of the contention-based random access procedure.

That is, even when the transmission of the uplink signal in a certain subframe is not permitted in accordance with the third configuration, the terminal device 1 may perform the PUSCH transmission corresponding to the random access response grant in the subframe as part of the contention-based random access procedure.

Irrespective of the third configuration of a certain subframe, the terminal device 1 may perform the PUSCH transmission scheduled using the DCI format to which the CRC parity bits scrambled by the temporary C-RNTI are attached in the subframe as part of the contention-based random access procedure.

That is, even when the transmission of the uplink signal in a certain subframe is not permitted in accordance with the third configuration, the terminal device 1 may perform the PUSCH transmission scheduled using the DCI format to which the CRC parity bits scrambled by the temporary C-RNTI are attached in the subframe as part of the contention-based random access procedure.

Irrespective of the third configuration of a certain subframe, the terminal device 1 may perform the PUSCH transmission corresponding to the HARQ indicator (the PHICH) in the subframe as part of the contention-based random access procedure.

That is, even when the transmission of the uplink signal in a certain subframe is not permitted in accordance with the third configuration, the terminal device 1 may perform the PUSCH transmission corresponding to the HARQ indicator (the PHICH) in the subframe as part of the contention-based random access procedure.

Irrespective of the third configuration of a certain subframe, the terminal device 1 may perform the PUSCH transmission corresponding to retransmission of the same uplink data (the transport block) in the subframe as part of the contention-based random access procedure.

That is, the terminal device 1 may the PUSCH transmission based on the third configuration unless the PUSCH transmission corresponds to a random access response grant or retransmission of the same transport block as part of the contention-based random access procedure.

For example, when the transmission of the uplink signal in a certain subframe is permitted in accordance with the third configuration, the terminal device 1 may perform the PUSCH transmission scheduled using the DCI format to which the CRC parity bits scrambled by the C-RNTI are attached in the subframe.

When the transmission of the uplink signal in a certain subframe is not permitted in accordance with the third configuration, the terminal device 1 may drop the PUSCH transmission scheduled using the DCI format to which the CRC parity bits scrambled by the C-RNTI are attached in the subframe.

When the transmission of the uplink signal in a certain subframe is permitted in accordance with the third configuration, the terminal device 1 may perform the PUSCH transmission corresponding to the random access response grant or the retransmission of the same transport block in the subframe as part of the contention-based random access procedure.

When the transmission of the uplink signal in a certain subframe is not permitted in accordance with the third configuration, the terminal device 1 may drop the PUSCH transmission corresponding to the random access response grant or the retransmission of the same transport block in the subframe as part of the contention-based random access procedure.

When the transmission of the uplink signal in a certain subframe is permitted in accordance with the third configuration, the terminal device 1 may perform the PUSCH transmission which is not part of the contention-based random access procedure and corresponds to the HARQ indicator (the PHICH) in the subframe.

When the transmission of the uplink signal in a certain subframe is not permitted in accordance with the third configuration, the terminal device 1 may drop the PUSCH transmission which is not part of the contention-based random access procedure and corresponds to the HARQ indicator (the PHICH) in the subframe.

Here, the third configuration may not be used for the PUSCH transmission scheduled using the DCI format to which the CRC parity bits scrambled by the C-RNTI are attached or may be used for the PUSCH transmission corresponding to the retransmission of the same transport block based on the HARQ indicator (the PHICH).

That is, irrespective of the third configuration of a certain subframe, the terminal device 1 may perform the PUSCH transmission scheduled using the DCI format to which the CRC parity bits scrambled by the temporary C-RNTI are attached in the subframe.

That is, even when the transmission of the uplink signal in a certain subframe is not permitted in accordance with the third configuration, the terminal device 1 may perform the PUSCH transmission scheduled using the DCI format to which the CRC parity bits scrambled by the temporary C-RNTI are attached in the subframe.

As described above, by using the third configuration, it is possible to prevent the terminal device 1 erroneously receiving/decoding the scheduling information from transmitting the uplink signal. That is, by permitting the transmission of the uplink signal in the subframe indicated as the uplink subframe in accordance with the third configuration or by permitting the transmission of the uplink signal in the UpPTS of the subframe indicated as the special subframe in accordance with the third configuration, it is possible to transmit a higher reliable link signal. By not permitting the transmission of the uplink signal in the subframe indicated as the downlink subframe in accordance with the third configuration or by not permitting the transmission of the uplink signal in the DwPTS and the GP of the subframe indicated as the special subframe in accordance with the third configuration, it is possible to transmit the higher reliable link signal. That is, it is possible to prevent interference occurring because the terminal device 1 erroneously receiving/decoding the scheduling information transmits the uplink signal, and thus it is possible to perform more efficient communication in the radio communication system.

When the terminal device 1 performs the PUSCH transmission as part of the contention-based random access procedure irrespective of the third configuration, the terminal device 1 and previously released terminal devices (for example, terminal devices corresponding to any of LTE Rel.8 to LTE Rel.10) coexist in the radio communication system. Thus, it is possible to perform more efficient communication.

That is, when the base station device 3 does not use the third configuration for a period in which the terminal device 1 with which the base station device 3 communicates cannot be known, the terminal device 1 and previously released terminal devices coexist in the radio communication system. Thus, it is possible to perform more efficient communication.

A program operated in the base station device 3 and the mobile station device 1 according to the invention may be a program (a program causing a computer to function) controlling a central processing unit (CPU) so that the functions of the foregoing embodiment related to the invention are realized. Information handled in these devices is temporarily accumulated in a random access memory (RAM) at the time of processing the information, the information is subsequently stored in any of various read-only memories (ROMs) such as flash ROMs or a hard disk drive (HDD), is read by the CPU, as necessary, and is corrected and written.

Parts of the mobile station device 1 and the base station device 3 according to the above-described embodiment may be realized by a computer. In this case, the parts may be realized by recording a program realizing the control function in a computer-readable recording medium, reading the program recorded in the recording medium to a computer system, and executing the program.

The "computer system" mentioned herein is a computer system internally included in the mobile station device 1 or the base station device 3 and is assumed to include an OS or hardware such as a peripheral device. The "computer-readable recording medium" refers to a portable medium such as a flexible disk, a magneto-optical disc, a ROM, or a CD-ROM or refers to a storage device such as a hard disk internally included in a computer system.

The "computer-readable recording medium" may include a medium that retains a program dynamically in a short time, such as a communication line when a program is transmitted via a network such as the Internet or a communication line such as a telephone line and a medium that retains a program for a given time, such as a volatile memory inside a computer system serving as a server or a client in this case. The program may be a program that realizes some of the above-described functions or may be a program that can realize the above-described functions in a combination with a program already recorded in a computer system.

The base station device 3 according to the above-described embodiment can be realized as a collective (device group) formed by a plurality of devices. Each of the devices forming the device group may include some or all of the functions or the function blocks of the base station device 3 according to the above-described embodiment. Each device may have each of the general functions or each of the function blocks of the base station device 3 as the device group. The mobile station device 1 according to the above-described embodiment can also communicate with base station devices serving as a collective.

The base station device 3 according to the above-described embodiment may be an Evolved Universal Terrestrial Radio Access Network (EUTRAN). The base station device 3 according to the above-described embodiment may have some or all of the functions of a higher node of an eNodeB.

Parts or all of the terminal device 1 and the base station device 3 according to the above-described embodiment may be realized as an LSI which is typically an integrated circuit or may be realized as a chip set. The function blocks of the terminal device 1 and the base station device 3 may be individually realized as chips, or some or all of the function blocks may be integrated to be realized as chips. A method of realizing an integrated circuit is not limited to an LSI, but may be realized as a dedicated circuit or a general-purpose processor. When a technology for realizing an integrated circuit substituted with an LSI with an advance in a semiconductor technology appears, an integrated circuit realized by the technology can also be used.

In the above-described embodiment, the terminal device or the communication device has been described as an example, but the present invention is not limited thereto. The present invention can also be applied to stationary or non-portable electronic devices installed indoors or outdoors, for example, terminal devices or communication devices such as AV devices, kitchen devices, cleaning and washing devices, air conditioners, office devices, automatic vending machines, or other life appliances.

The terminal devices may be generally referred to as mobile or fixed user end devices such as user equipment (UE), mobile stations (MS) (mobile terminals (MT)), mobile station devices, mobile terminals, subscriber units, subscriber stations, radio terminals, mobile body devices, nodes, devices, remote stations, remote terminals, radio communication devices, radio communication equipment, user agents, and access terminals.

The base station device may also be generally referred to as any nodes of network ends communicating with terminals such as nodeB, enhanced nodeB (eNodeB), base stations, and access points (AP). The devices may include Remote Radio Heads (RRH) (also referred to as remote radio units (RRU), remote antennas, or distributed antennas).

The embodiments of the present invention have been described above in detail with reference to the drawings, but specific configurations are not limited to the embodiments and include design configurations or the like within the scope of the present invention without departing from the gist of the present invention. The present invention can be modified in various ways within the scope described in the claims and embodiments obtained by appropriately combining the technical means disclosed in other embodiments are also included in the technical range of the invention. Configurations in which elements described in the embodiments and having the same advantages are substituted with each other are also included.

DESCRIPTION OF REFERENCE NUMERALS 1 (1A, 1B, 1C) TERMINAL DEVICE
3 BASE STATION DEVICE
101 DATA CONTROL SECTION
102 TRANSMISSION DATA MODULATION SECTION
103 RADIO SECTION
104 SCHEDULING SECTION
105 CHANNEL ESTIMATION SECTION
106 RECEIVED-DATA DEMODULATION SECTION
107 DATA EXTRACTION SECTION
108 HIGHER LAYER
109 ANTENNA
301 DATA CONTROL SECTION
302 TRANSMISSION DATA MODULATION SECTION
303 RADIO UNIT
304 SCHEDULING SECTION
305 CHANNEL ESTIMATION SECTION
306 RECEIVED-DATA DEMODULATION SECTION
307 DATA EXTRACTION SECTION
308 HIGHER LAYER
309 ANTENNA

The invention claimed is:

1. A terminal device configured to communicate with a base station device, the terminal device comprising:
reception circuitry configured to
receive an RRC message including first information indicating an uplink-downlink configuration,
receive, on a physical downlink control channel, second information indicating an uplink-downlink configuration, and
receive a random access response; and
transmission circuitry configured to perform, in a subframe indicated as an uplink subframe by the uplink-downlink configuration based on the second information, transmission on a physical uplink shared channel that is based on decoding of a physical downlink control channel with a CRC scrambled by a C-RNTI,
wherein the transmission circuitry is configured to perform, based on information included in the random access response, transmission on a physical uplink shared channel in an uplink subframe based on the uplink-downlink configuration indicated by the first information.

2. The terminal device according to claim 1, wherein the transmission circuitry is configured not to perform, in a subframe indicated as a downlink subframe by the uplink-downlink configuration based on the second information, the transmission on the physical uplink shared channel based on the decoding of the physical downlink control channel with the CRC scrambled by the C-RNTI.

3. A base station device configured to communicate with a terminal device, the base station device comprising:
transmission circuitry configured to
transmit an RRC message including first information indicating an uplink-downlink configuration,
transmit, on a physical downlink control channel, second information indicating an uplink-downlink configuration, and
transmit a random access response; and
reception circuitry configured to perform, in a subframe indicated as an uplink subframe by the uplink-downlink configuration based on the second information, reception on a physical uplink shared channel that is based on decoding of a physical downlink control channel with a CRC scrambled by a C-RNTI,
wherein the reception circuitry is configured to perform, based on information included in the random access response, reception on a physical uplink shared channel in an uplink subframe based on the uplink-downlink configuration indicated by the first information.

4. The base station device according to claim 3, wherein the reception circuitry is configured not to perform, in a subframe indicated as a downlink subframe by the uplink-downlink configuration based on the second information, the reception on the physical uplink shared channel based on the decoding of the physical downlink control channel with the CRC scrambled by the C-RNTI.

5. A communication method for a terminal device configured to communicate with a base station device, the communication method comprising:
receiving an RRC message including first information indicating an uplink-downlink configuration;

receiving, on a physical downlink control channel, second information indicating an uplink-downlink configuration;

receiving a random access response;

performing, in a subframe indicated as an uplink subframe by the uplink-downlink configuration based on the second information, transmission on a physical uplink shared channel that is based on decoding of a physical downlink control channel with a CRC scrambled by a C-RNTI; and performing, based on information included in the random access response, transmission on a physical uplink shared channel in an uplink subframe based on the uplink-downlink configuration indicated by the first information.

6. The communication method according to claim 5, wherein the transmission on the physical uplink shared channel based on the decoding of the physical downlink control channel with the CRC scrambled by the C-RNTI is not performed in a subframe indicated as a downlink subframe by the uplink-downlink configuration based on the second information.

7. A communication method for a base station device configured to communicate with a terminal device, the communication method comprising:

transmitting an RRC message including first information indicating an uplink-downlink configuration;

transmitting, on a physical downlink control channel, second information indicating an uplink-downlink configuration;

transmitting a random access response;

performing, in a subframe indicated as an uplink subframe by the uplink-downlink configuration based on the second information, reception on a physical uplink shared channel that is based on decoding of a physical downlink control channel with a CRC scrambled by a C-RNTI; and performing, based on information included in the random access response, reception on a physical uplink shared channel in an uplink subframe based on the uplink-downlink configuration indicated by the first information.

8. The communication method according to claim 7, wherein the reception on the physical uplink shared channel based on the decoding of the physical downlink control channel with the CRC scrambled by the C-RNTI is not performed in a subframe indicated as a downlink subframe by the uplink-downlink configuration based on the second information.

* * * * *